United States Patent
Morimura

(10) Patent No.: US 10,818,178 B2
(45) Date of Patent: Oct. 27, 2020

(54) VEHICLE OPERATION MANAGEMENT SYSTEM AND VEHICLE OPERATION MANAGEMENT METHOD

(71) Applicant: Panasonic Intellectual Property Management Co., Ltd., Osaka (JP)

(72) Inventor: Kazuo Morimura, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/452,572

(22) Filed: Jun. 26, 2019

(65) Prior Publication Data

US 2019/0318625 A1 Oct. 17, 2019

Related U.S. Application Data

(63) Continuation of application No. PCT/JP2018/001105, filed on Jan. 17, 2018.

(30) Foreign Application Priority Data

Jan. 18, 2017 (JP) ................................ 2017-007042

(51) Int. Cl.
*G08G 1/123* (2006.01)
*B60Q 1/50* (2006.01)
(Continued)

(52) U.S. Cl.
CPC ............. *G08G 1/123* (2013.01); *B60Q 1/503* (2013.01); *B60Q 5/005* (2013.01); *G05D 1/0225* (2013.01)

(58) Field of Classification Search
CPC . G08G 1/00; G08G 1/123; B60Q 1/00; B60Q 1/005; B60Q 1/26; B60Q 1/50;
(Continued)

(56) References Cited

U.S. PATENT DOCUMENTS

| 9,905,133 | B1* | 2/2018 | Kumar | ................... G07C 5/008 |
| 2005/0195095 | A1* | 9/2005 | Kato | ...................... G08G 1/143 |
| | | | | 340/932.2 |

(Continued)

FOREIGN PATENT DOCUMENTS

JP 2016-115364 6/2016

OTHER PUBLICATIONS

International Search Report of PCT application No. PCT/JP2018/001105 dated Feb. 20, 2018.

*Primary Examiner* — Thang V Tran
(74) *Attorney, Agent, or Firm* — Greenblum & Bernstein, P.L.C.

(57) ABSTRACT

A vehicle operation management system includes a communication terminal and a plurality of vehicles that communicates with the terminal, and is capable of autonomously driving. The vehicles include a first vehicle and a second vehicle. In a boarding area, when the first vehicle is at a leading portion in a file, the second vehicle is at a next position in the file, and one boarding request is made from the terminal, the first notification unit in the first vehicle notifies that the first vehicle is available for boarding, and the second notification unit in the second vehicle does not notify that the second vehicle is available for boarding. When the first vehicle is at the leading portion and the second vehicle is located at the nest position, and at least two boarding requests are made, the first and second notification units notify that the first and second vehicles, respectively, are available for boarding.

20 Claims, 18 Drawing Sheets

(51) Int. Cl.
  *G05D 1/02* (2020.01)
  *B60Q 5/00* (2006.01)
(58) Field of Classification Search
  CPC . B60Q 1/503; B60Q 5/00; B60Q 1/48; B60Q
      5/005; G06Q 50/00; G06Q 50/30; G01C
      21/26; G05D 1/02; G05D 1/021; G05D
      1/0225
  See application file for complete search history.

(56) References Cited

U.S. PATENT DOCUMENTS

| | | | |
|---|---|---|---|
| 2007/0299577 A1* | 12/2007 | Hattori | G07C 9/00309 |
| | | | 701/29.6 |
| 2017/0008490 A1* | 1/2017 | Sako | B60R 25/25 |
| 2017/0292854 A1* | 10/2017 | Zhang | G08G 1/143 |
| 2018/0290622 A1* | 10/2018 | Mori | B60R 25/01 |
| 2018/0314988 A1* | 11/2018 | Harada | G06Q 10/02 |
| 2018/0329429 A1* | 11/2018 | Yamaguchi | G05D 1/0297 |

* cited by examiner

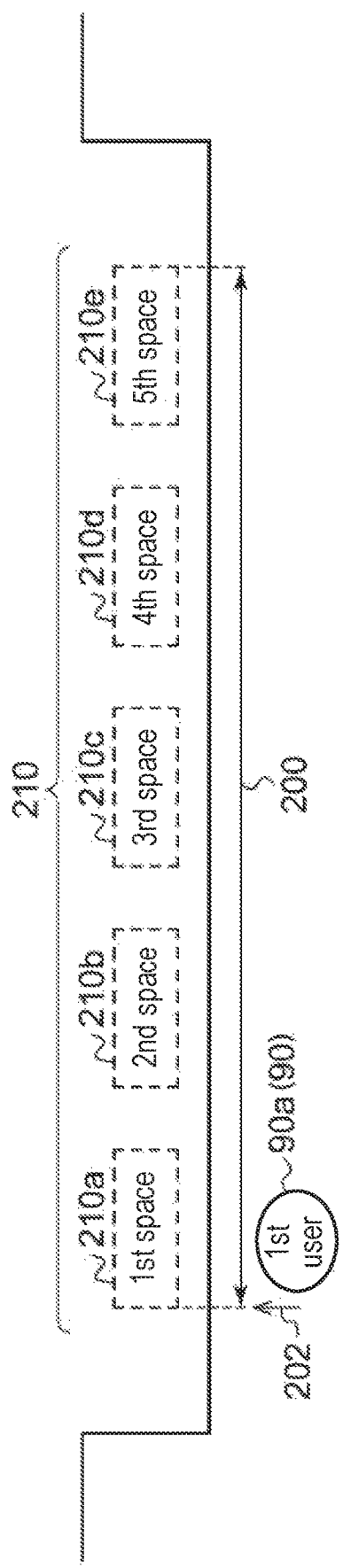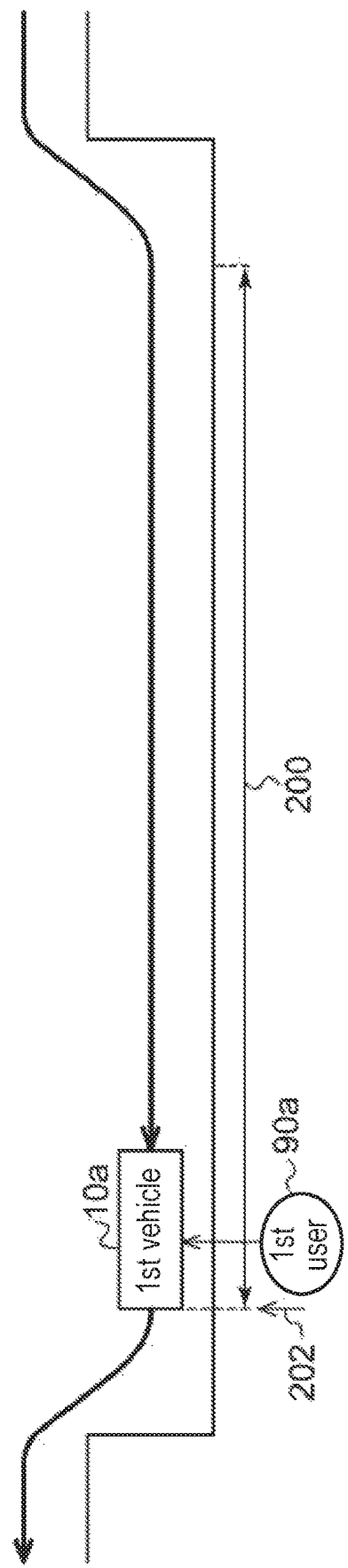

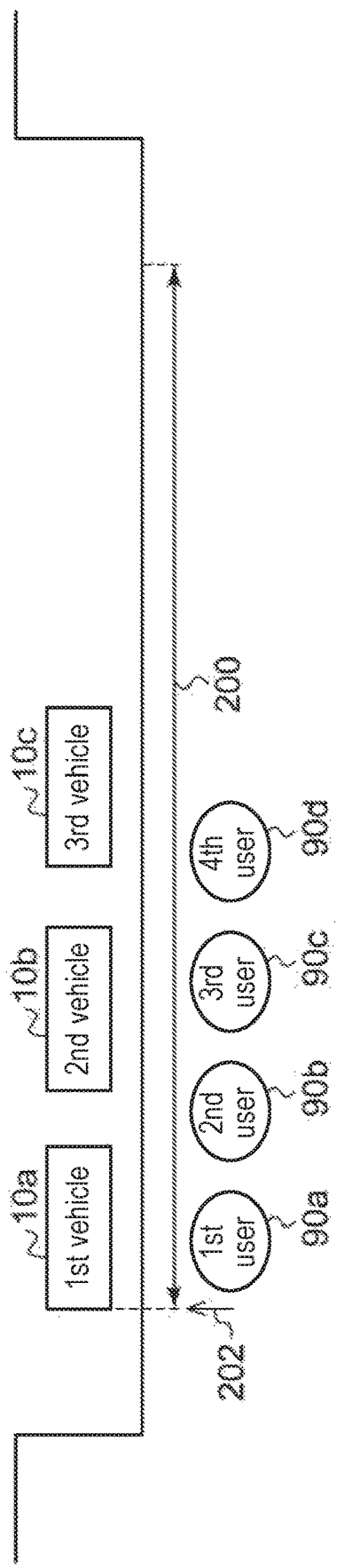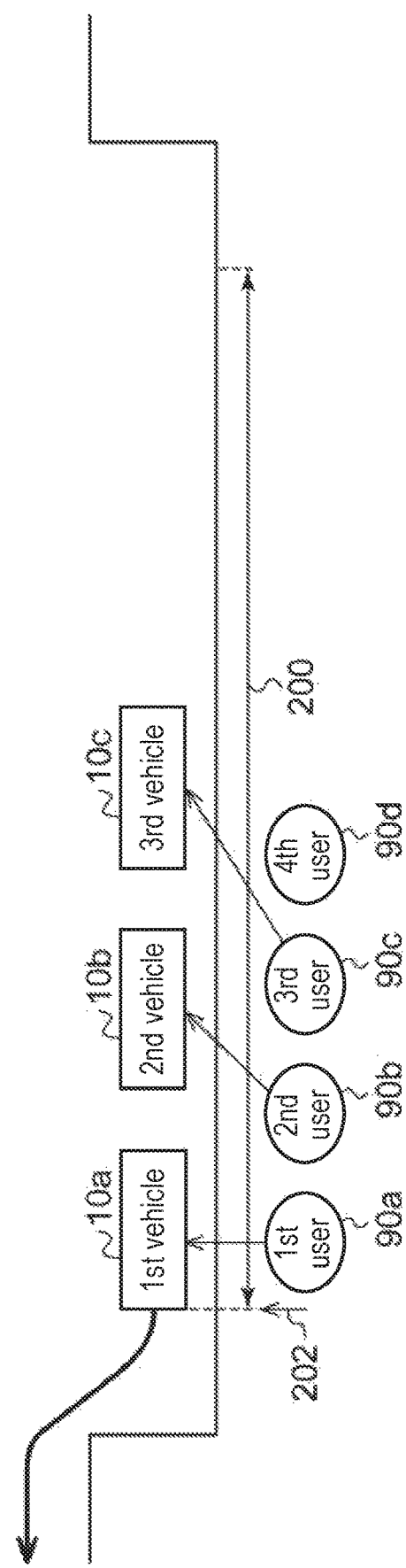

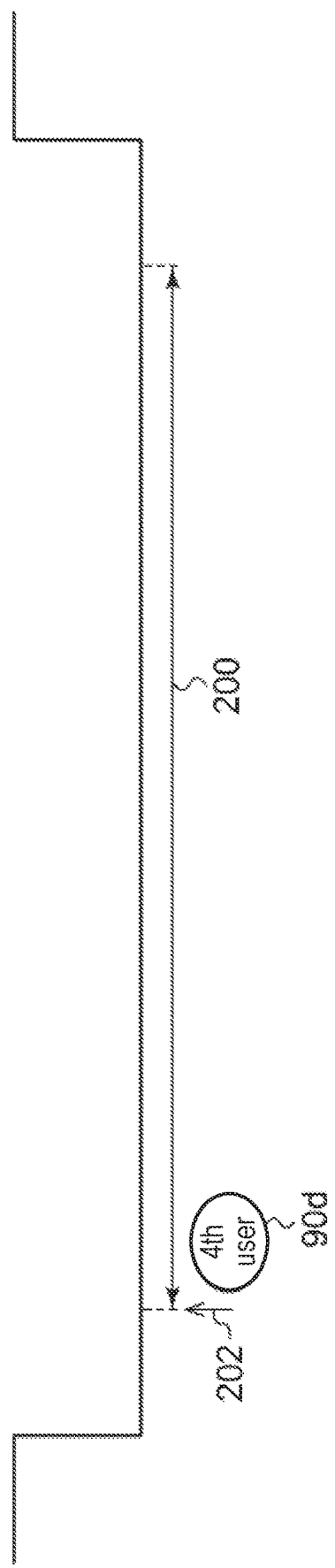

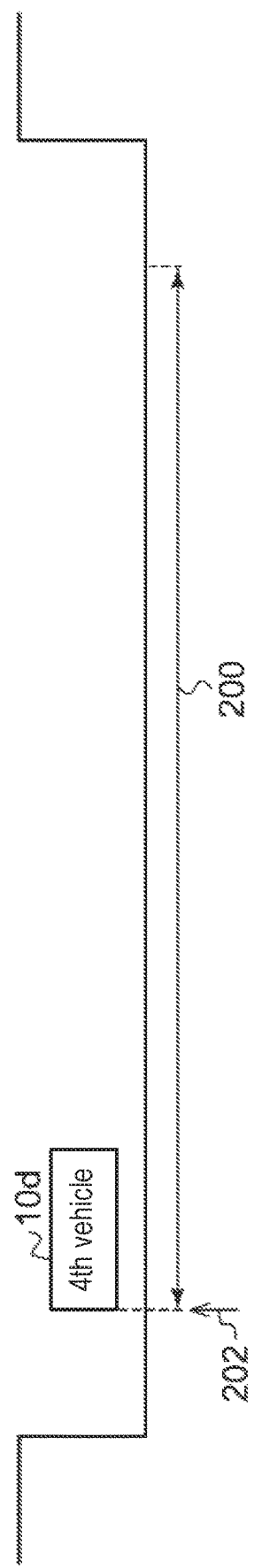

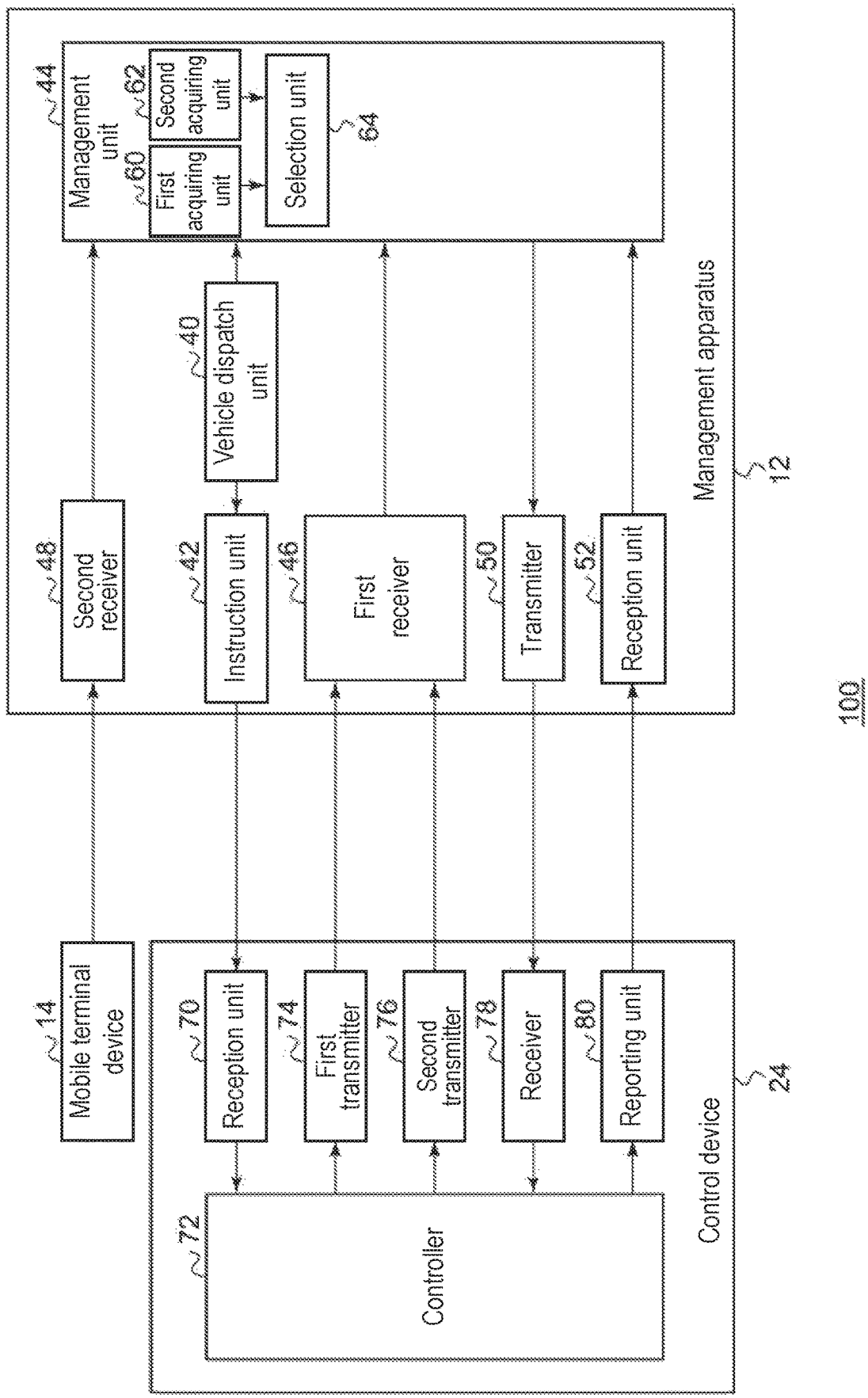

VEHICLE OPERATION MANAGEMENT SYSTEM AND VEHICLE OPERATION MANAGEMENT METHOD

CROSS-REFERENCE TO RELATED APPLICATIONS

This application is a U.S. national stage application of the PCT International Application No. PCT/JP2018/001105 filed on Jan. 17, 2018, which claims the benefit of foreign priority of Japanese patent application No. 2017-007042 filed on Jan. 18, 2017, the contents all of which are incorporated herein by reference.

BACKGROUND

1. Technical Field

The present disclosure relates to a vehicle operation management technology, and particularly relates to a vehicle operation management system and a vehicle operation management method that manage vehicle boarding.

2. Description of the Related Art

An autonomous driving vehicle that can perform autonomous driving and unmanned driving has been developed. Such an autonomous driving vehicle moves to a use start position through the unmanned travelling, and allows a user to board at the use start position (for example refer to Japanese Unexamined Patent Publication No. 2016-115364).

SUMMARY

The present disclosure provides a technique to achieve safe vehicle boarding.

A vehicle operation management system according to one aspect of the present disclosure includes a communication terminal and a plurality of vehicles. The plurality of vehicles communicates with the communication terminal, and is autonomously driving. The plurality of vehicles is operative to stand by in a predetermined boarding area in a file, and accept boarding of a user at least at a leading portion in the file. The plurality of vehicles includes a first vehicle and a second vehicle. The first vehicle includes a first notification unit that is operative to send a first notification to an outside of the first vehicle. The second vehicle includes a second notification unit that is operative to send a second notification to an outside of the second vehicle. When the first vehicle and the second vehicle stand by in the predetermined boarding area in the file, the first vehicle is located at a first position that is the leading portion in the file, the second vehicle is located at a second position that is a position next to the first vehicle in the file, and one boarding request corresponding to the predetermined boarding area is made from the communication terminal, the first notification unit in the first vehicle sends the first notification indicating that the first vehicle is available for boarding, and the second notification unit in the second vehicle does not send the second notification indicating that the second vehicle is available for boarding. When the first vehicle and the second vehicle stand by in the predetermined boarding area in the file, the first vehicle is located at the first position, the second vehicle is located at the second position, and at least two boarding requests corresponding to the predetermined boarding area are made from the communication terminal, the first notification unit in the first vehicle sends the first notification indicating that the first vehicle is available for boarding, and the second notification unit in the second vehicle sends the second notification indicating that the second vehicle is available for boarding.

A vehicle operation management method according to another aspect of the present disclosure is capable of being used in a vehicle operation management system including a communication terminal and a plurality of vehicles. The plurality of vehicles communicates with the communication terminal, and is autonomously driving. The plurality of vehicles is operative to stand by in a predetermined boarding area in a file, and accept boarding of a user at least at a leading portion in the file. The plurality of vehicles includes a first vehicle and a second vehicle. The first vehicle includes a first notification unit that is operative to send a first notification to an outside of the first vehicle. The second vehicle includes a second notification unit that is operative to send a second notification to an outside of the second vehicle. In the vehicle operation management method, when the first vehicle and the second vehicle stand by in the predetermined boarding area in the file, the first vehicle is located at a first position that is the leading portion in the file, the second vehicle is located at a second position that is a position next to the first vehicle in the file, and one boarding request corresponding to the predetermined boarding area is made from the communication terminal, the first notification unit in the first vehicle sends the first notification indicating that the first vehicle is available for boarding, and the second notification unit in the second vehicle does not send the second notification indicating that the second vehicle is available for boarding. Furthermore, in the vehicle operation management method, when the first vehicle and the second vehicle stand by in the predetermined boarding area in the file, the first vehicle is located at the first position, the second vehicle is located at the second position, and at least two boarding requests corresponding to the predetermined boarding area are made from the communication terminal, the first notification unit in the first vehicle sends the first notification indicating that the first vehicle is available for boarding, and the second notification unit in the second vehicle sends the second notification indicating that the second vehicle is available for boarding.

Any combinations of the above-described components and modifications of the features of the present disclosure in methods, devices, systems, recording media, and computer programs are still effective as other aspects of the present disclosure.

According to the present disclosure, safe vehicle boarding can be achieved.

BRIEF DESCRIPTION OF DRAWINGS

FIG. 2A illustrates an outline of processing performed by the management system in FIG. 1.

FIG. 2B illustrates the outline of the processing performed by the management system in FIG. 1.

FIG. 3A illustrates an outline of different processing performed by the management system in FIG. 1.

FIG. 3B illustrates the outline of the different processing performed by the management system in FIG. 1.

FIG. 3C illustrates the outline of the different processing performed by the management system in FIG. 1.

FIG. 4C illustrates the outline of the still different processing performed by the management system in FIG. 1.

FIG. 5 illustrates a detailed configuration of the management system in FIG. 1.

DETAILED DESCRIPTION OF PREFERRED EMBODIMENTS

Prior to describing exemplary embodiments according to the present disclosure, a problem found in a conventional technique will briefly be described. When a vehicle capable of autonomously driving is used like a taxi, the vehicle is dispatched aiming at a leading location of a boarding area corresponding to a taxi stand, and after the vehicle arrives at the boarding area, second and subsequent vehicles stop behind this vehicle in a file (in a queue). The leading location is defined as a boarding point, and a user boards the leading vehicle at the boarding point to depart. Second and subsequent vehicles then move forward to the boarding point by a distance corresponding to one vehicle. Herein, assuming two users arrive at the boarding point simultaneously, one user boards the leading vehicle, and the other user boards a second vehicle. If the leading vehicle has departed when the other user is just about to board the second vehicle, the second vehicle may start moving forward.

Prior to specifically describing the exemplary embodiments according to the present disclosure, an outline of the exemplary embodiments will be described. The exemplary embodiments according to the present disclosure relate to a management system including a control device mounted on a vehicle capable of autonomously driving and a management apparatus that manages vehicle dispatch by communicating with the control device. Such a vehicle is a taxi, as an example. As described above, the vehicle A is dispatched aiming at the boarding point, but when another vehicle B has already stopped at the boarding point, this vehicle A stops behind the other vehicle B. When the other vehicle B departed, this vehicle A moves forward toward the boarding point. Therefore, it is desired that the second stopping vehicle A is prevented from starting moving forward when the leading vehicle B has departed, if the user is just about to board the second stopping vehicle A. A management apparatus according to the present exemplary embodiment presumes occurrence of a situation in which the user is about to board the vehicle in the second position in the file and prevents the vehicle in the second position in the file from moving forward toward the boarding point when such a situation occurs.

First Exemplary Embodiment

Figure 1:
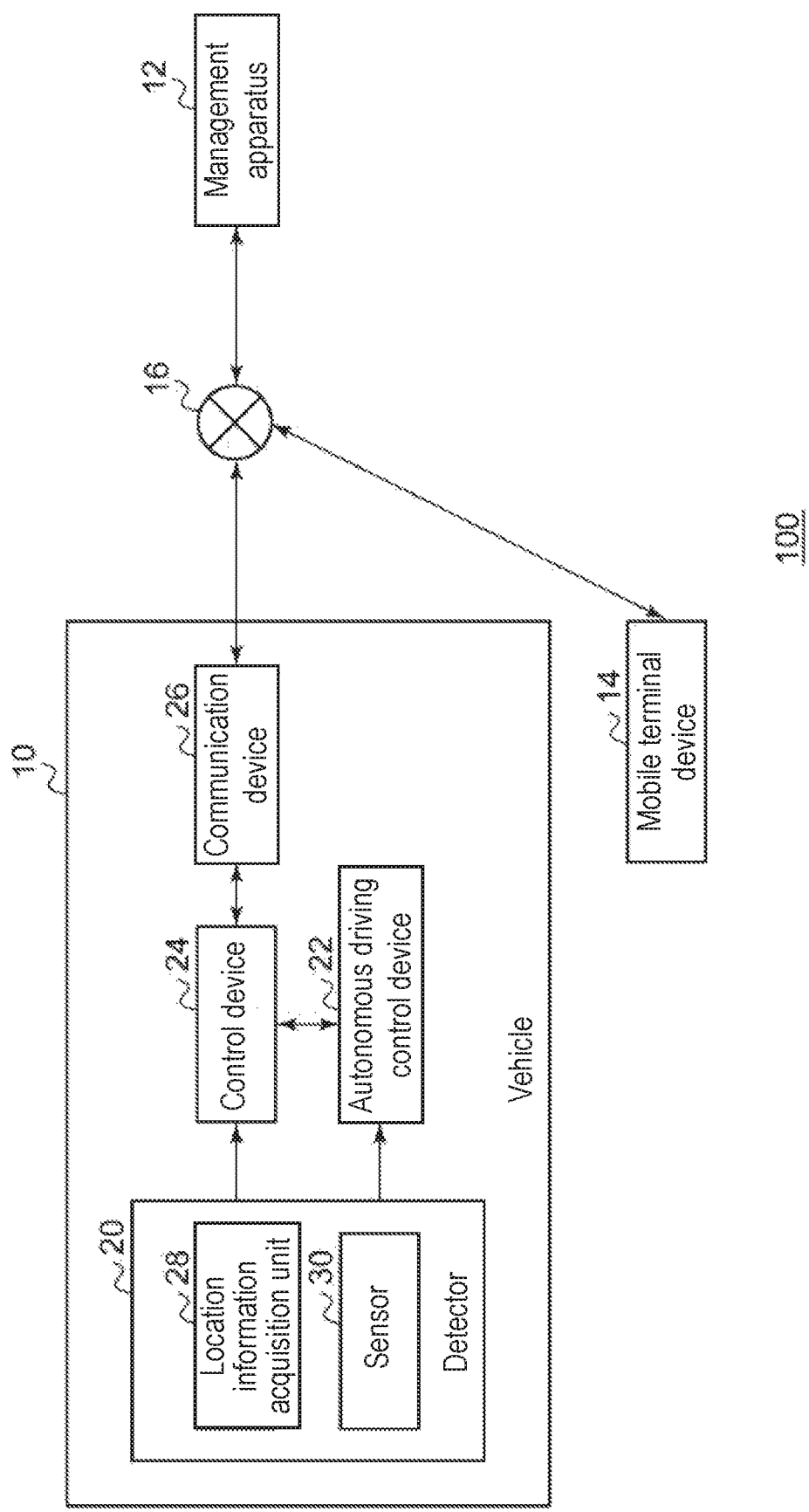
FIG. 1 illustrates a configuration of a management system according to a first exemplary embodiment.

FIG. 1 illustrates a configuration of management system 100 according to a first exemplary embodiment of the present disclosure. Management system 100 includes vehicle 10, management apparatus 12, mobile terminal device 14, and network 16. Vehicle 10 includes detector 20, autonomous driving control device 22, control device 24, and communication device 26. Detector 20 includes location information acquisition unit 28 and sensor 30. Herein, a number of vehicles 10 and a number of mobile terminal devices 14 are set to be "one", but the numbers may be plural.

Location information acquisition unit 28 acquires a current location of vehicle 10 from a global navigation satellite system(s) (GNSS(s)) receiver. Any publicly known technique only needs to be used for acquiring the current location, and thus description of such a process will be omitted herein.

Sensor 30 is a general term for various sensors that detect an outside situation of the vehicle and a state of vehicle 10. For example, a camera, a millimeter-wave radar, a light detection and ranging, laser imaging detection and ranging (LIDAR), a sonar, a temperature sensor, an atmospheric pressure sensor, a humidity sensor, and an illuminance sensor are mounted as the sensor that detects the outside situation of the vehicle. The outside situation of the vehicle includes a situation of a road where the own vehicle travels, which includes lane information, an environment including weather, a surrounding situation of the own vehicle, and other vehicles (such as other vehicles traveling in the adjacent lane) present nearby. Any information about the outside of the vehicle that can be detected by sensor 30 may be used. For example, an acceleration sensor, a gyroscope sensor, a geomagnetism sensor, and an inclination sensor are mounted as sensor 30 that detects the state of vehicle 10.

Autonomous driving control device 22 is an autonomous driving controller having an autonomous driving control function mounted thereon, and determines a behavior of vehicle 10 in autonomous driving. Specifically, autonomous driving control device 22 applies a control command input from control device 24 and various pieces of information collected from detector 20 or various electronic control units (ECUs) to an autonomous driving algorithm, and calculates a control value for controlling an autonomous control object such as an accelerator throttle opening and a steering angle of vehicle 10.

In particular, the control value is calculated so as to travel according to a traveling route, and to stop when an obstacle, for example, other vehicle 10 is detected by detector 20. Note that the traveling route is generated by control device 24, and is input into autonomous driving control device 22, for example. Autonomous driving control device 22 transmits the calculated control value to the ECU or the controller of the corresponding control target. In the first exemplary embodiment, autonomous driving control device 22 transmits the calculated control value to the steering ECU, the brake ECU, the engine ECU, and the indicator controller. Note that when vehicle 10 is an electrically driven vehicle or a hybrid car, the control value is transmitted to the motor ECU instead of or in addition to the engine ECU. Any publicly known technique only needs to be used for autonomous driving control device 22, and thus description thereof will be omitted herein.

Control device 24 is mounted on vehicle 10 that performs autonomous driving, and controls autonomous driving control device 22. Herein, the description will be given focusing on control of dispatch of vehicle 10. Control device 24 is connected to communication device 26 and communicates with management apparatus 12 through communication device 26 and network 16, thereby receiving an instruction of a boarding point to be aimed at (hereinafter, referred to as "instruction notification") from management apparatus 12. The boarding point is represented by a latitude and a longitude, for example. Control device 24 generates the traveling route from the current location to the boarding point based on map information and location information received from detector 20. Any publicly known technique only needs to be used for such traveling route generation, and thus description of the traveling route generation will be omitted herein. Control device 24 outputs the generated traveling route to autonomous driving control device 22. Subsequent control, in particular, control near the boarding point will be described later.

Communication device 26 is adapted to a mobile phone communication system, a wireless metropolitan area network (WMAN), or the like, and performs wireless communication. Network 16 is configured with a combination of wireless communication and wired communication. Management apparatus 12, mobile terminal device 14, and communication device 26 can communicate with one another through network 16. Therefore control device 24 performs communication through communication device 26. However, to make the description clear, the description will be given as if control device 24 performs communication while omitting communication device 26, in some cases.

Examples of mobile terminal device 14 include a mobile phone terminal, a smartphone, and a tablet terminal, which are carried by a user. Note that mobile terminal device 14 may be installed as a dedicated terminal near the boarding point. The user operates mobile terminal device 14 to generate notification for requesting boarding at the boarding point (hereinafter, referred to as "boarding request notification"). Mobile terminal device 14 transmits the boarding request notification to management apparatus 12 through network 16.

Management apparatus 12 communicates with communication device 26 mounted on vehicle 10 through network 16, thereby controlling dispatch of each of a plurality of vehicles 10 to boarding point 202 (refer to FIG. 2A). Management apparatus 12 transmits the instruction notification including the dispatching result to control device 24. Subsequent processing, in particular, processing near the boarding point will be described later. Management apparatus 12 receives the boarding request notification from mobile terminal device 14 through network 16. Management apparatus 12 thus grasps a number of users requesting boarding at the boarding point. Note that, to make the description clear, it is assumed that one user boards one vehicle 10.

Figure 2C:
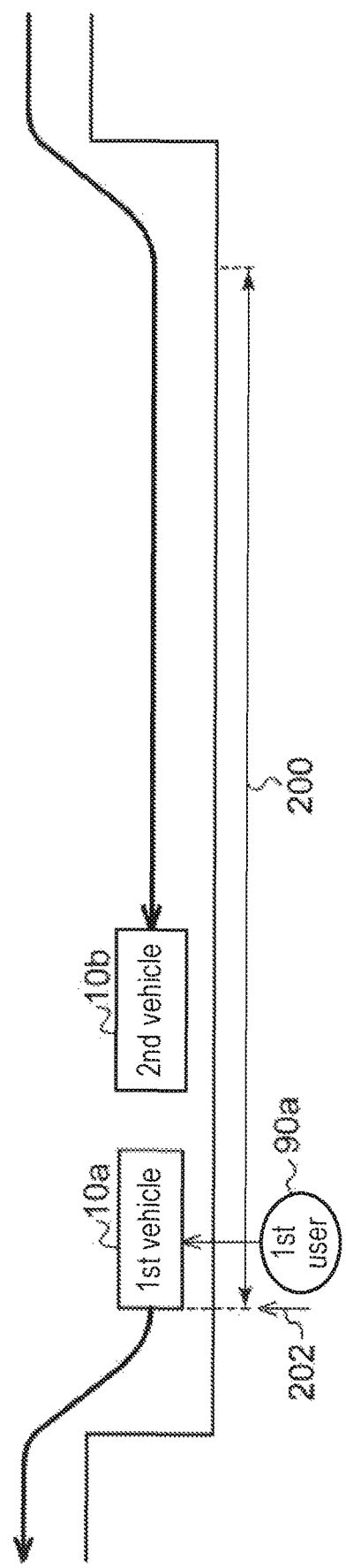
FIG. 2C illustrates the outline of the processing performed by the management system in FIG. 1.

FIGS. 2A to 2D illustrate an outline of processing performed by management system 100. FIG. 2A is a view illustrating a configuration near boarding point 202. In boarding area 200, first (1st) space 210a to fifth (5th) space 210e are disposed in this order as a line. First space 210a to fifth space 210e are collectively referred to as space 210. One vehicle 10 can stop in one space 210. A number of spaces 210 included in boarding area 200 is not limited to "five". Herein, first space 210a is the leading location in boarding area 200. Boarding point 202 is allocated at first space 210a. First (1st) user 90a boards vehicle 10 at boarding point 202. Note that, in the following description, it is assumed that user 90 collectively referring to first user 90a uses mobile terminal device 14 to transmit the boarding request notification to management apparatus 12.

FIG. 2B illustrates first processing. Note that in the following description, illustration of space 210 in FIG. 2A is omitted. First (1st) vehicle 10a dispatched by management apparatus 12 enters boarding area 200 from the rear end of the boarding area 200, and arrives at boarding point 202. Control device 24 in first vehicle 10a arrived at boarding point 202 transmits, to management apparatus 12, notification (hereinafter, referred to as "arrival notification") for notifying that first vehicle 10a arrives at boarding point 202. First user 90a then boards first vehicle 10a at boarding point 202. First vehicle 10a transmits a report (hereinafter, referred to as a "boarding report") for reporting that user 90 has boarded first vehicle 10a to management apparatus 12. First vehicle 10a departs from boarding point 202 toward a destination set by first user 90a. Any publicly known technique only needs to be used for such processing, and thus description of the processing will be omitted herein.

Figure 2D:
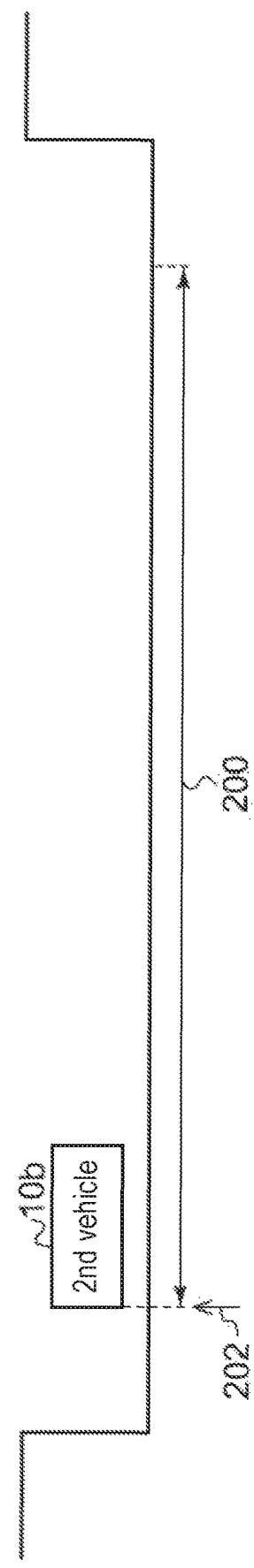
FIG. 2D illustrates the outline of the processing performed by the management system in FIG. 1.

FIGS. 2C to 2D illustrate second processing. Also herein, first vehicle 10A performs the first processing described above, and second (2nd) vehicle 10b performs the second processing. Similar to FIG. 2B, when first vehicle 10a has arrived at boarding point 202, second vehicle 10b enters boarding area 200 from the rear end of the boarding area 200. However, since first vehicle 10a stands by at boarding point 202, second vehicle 10b stops before arriving at boarding point 202 in boarding area 200. Specifically, second vehicle 10b stops behind first vehicle 10a, that is, at second (2nd) space 210b described above. Note that first vehicle 10a being present is detected by sensor 30 in second vehicle 10b.

When second vehicle 10b stops before arriving at boarding point 202, control device 24 in second vehicle 10b transmits notification (hereinafter, referred to as "pre-arrival notification") for notifying that second vehicle 10b enters boarding area 200, but stops before arriving at boarding point 202, to management apparatus 12. Similar to FIG. 2B, first vehicle 10a then allows first user 90a to board and departs. FIG. 2D illustrates a state subsequent to FIG. 2C. Since first vehicle 10a has departed, first space 210a is unoccupied. Sensor 30 of second vehicle 10b is caused not to detect first vehicle 10a, whereby second vehicle 10b moves forward and arrives at boarding point 202. Control device 24 in second vehicle 10b arrived at boarding point 202 transmits the arrival notification to management apparatus 12.

In the first processing and the second processing that have been described above, only first user 90a is present at boarding point 202. Therefore, the above-described situation in which second vehicle 10 moves forward while user 90 is boarding the vehicle is not caused. Hereinafter, third processing for preventing such a situation from being caused will be described. In the third processing, the number of vehicles 10 and the number of users 90 are both plural.

FIGS. 3A to 3C illustrate an outline of different processing performed by management system 100, which is the third processing. Also herein, first vehicle 10a performs the first processing. On the other hand, second vehicle 10b and third (3rd) vehicle 10c perform the third processing. FIG. 3A illustrates an initial state. At boarding point 202, first user 90a through fourth (4th) user 90d are waiting for the vehicles to board. On the other hand, similar to FIG. 2B, with first vehicle 10a having been arrived at boarding point 202, second vehicle 10b enters boarding area 200 from the rear end of the boarding area 200. As described above, second vehicle 10b stops behind first vehicle 10a, and control device 24 in second vehicle 10b transmits the pre-arrival notification to management apparatus 12. Third vehicle 10c also enters boarding area 200 from the rear end of the boarding area 200. Third vehicle 10c stops behind second vehicle 10b, and control device 24 in third vehicle 10c transmits the pre-arrival notification to management apparatus 12. In other words, at this stage, control device 24 in second vehicle 10b and control device 24 in third vehicle 10c perform processing equal to the second processing.

As a result, number M of vehicles 10 stopping in boarding area 200 is "three", and number N of users 90 waiting is "four", whereby M<N is satisfied. At this time, a situation in which first vehicle 10a that is boarded by first user 90a departs while second (2nd) user 90b is boarding second vehicle 10b, whereby second vehicle 10b moves forward toward boarding point 202 is disadvantageously caused. To prevent this situation, management apparatus 12 recognizes that number M of vehicles 10 in boarding area 200 is "three", based on the arrival notification and the pre-arrival notification from control device 24 in each vehicle 10. Further, management apparatus 12 recognizes that number N of users 90 at boarding point 202 is "four", based on the boarding request notification received from mobile terminal device 14. Management apparatus 12 compares M with N, and selects a smaller value, that is, "three". Selected "three" indicates that "three" users 90 are allowed to board "three" vehicles 10.

Management apparatus 12 transmits notification (hereinafter, referred to as "deemed arrival notification") to control device 24 of each of "two" vehicles 10 other than first vehicle 10a from which the arrival notification has been received among "three" vehicles 10. The deemed arrival notification is used for notifying that, even when a vehicle has not arrived at boarding point 202, the vehicle is deemed to be arrived at boarding point 202. Herein the deemed arrival notification is transmitted to control device 24 in second vehicle 10b and control device 24 in third vehicle 10c. When receiving the deemed arrival notification, those control devices 24 cause autonomous driving control device 22 in corresponding vehicle 10 not to travel to boarding point 202. As a result, second vehicle 10b and third vehicle 10c are brought into a state for simulating arrival at boarding point 202.

FIG. 3B illustrates a state subsequent to FIG. 3A. First user 90a to third (3rd) user 90c board first vehicle 10a to third vehicle 10c, respectively. At this moment, even when first vehicle 10a departs, second vehicle 10b and third vehicle 10c do not move forward. First vehicle 10a to third vehicle 10c finally depart. FIG. 3C illustrates a state subsequent to FIG. 3B. Only fourth user 90d waits at boarding point 202.

Figure 4A:
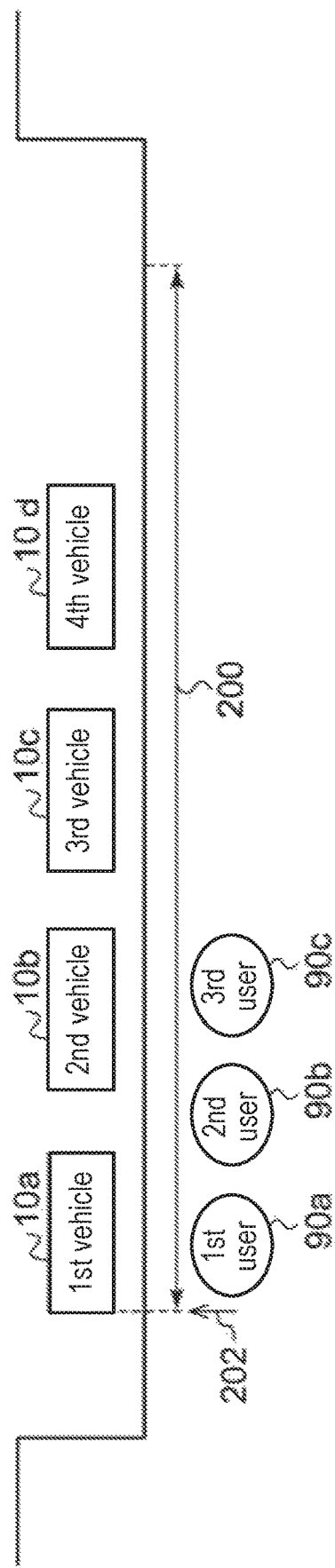
FIG. 4A illustrates an outline of still different processing performed by the management system in FIG. 1.
Figure 4B:
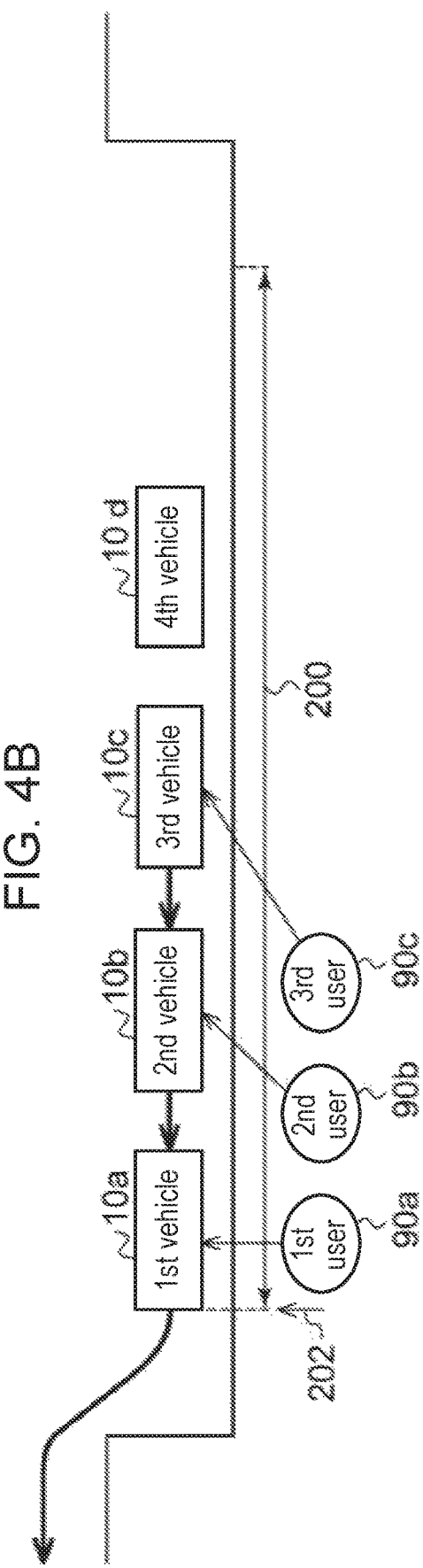
FIG. 4B illustrates the outline of the still different processing performed by the management system in FIG. 1.

FIGS. 4A to 4C illustrate an outline of still different processing performed by management system 100, which is the third processing. FIGS. 4A to 4C are different from FIGS. 3A to 3C in number M of vehicles 10 and number N of users 90. Also herein, first vehicle 10a performs the first processing, and second vehicle 10b and third vehicle 10c perform the third processing. Further, fourth (4th) vehicle 10d performs the second processing. FIG. 4A illustrates an initial state. First vehicle 10a to third vehicle 10c are the same as those in FIG. 3A, and therefore, description thereof will be omitted herein. Fourth vehicle 10d also enters boarding area 200 from the rear end of the boarding area 200. Fourth vehicle 10d stops behind third vehicle 10c, and control device 24 in fourth vehicle 10d transmits the pre-arrival notification to management apparatus 12. Therefore, at this stage, control device 24 in each of second vehicle 10b to fourth vehicle 10d performs identical processing.

Number M of vehicles 10 stopping in boarding area 200 is "four", and number N of users 90 waiting is "three", whereby M>N is satisfied. Management apparatus 12 recognizes that number M of vehicles 10 in boarding area 200 is "four", and number N of users 90 at boarding point 202 is "three", through processing similar to the above-described processing. Management apparatus 12 compares M with N, and selects a smaller value, that is, "three". Also herein, selected "three" indicates that "three" users 90 are allowed to board "three" vehicles 10.

Management apparatus 12 transmits the deemed arrival notification to control device 24 of each of "two" preceding vehicles 10 subsequent to first vehicle 10a from which the arrival notification has been received, among "three" vehicles 10. Note that management apparatus 12 periodically receives information on the current position from control device 24 of each vehicle 10, and recognizes that second vehicle 10b, third vehicle 10c, and fourth vehicle 10d stop in this order behind first vehicle 10a from the above information. Therefore the deemed arrival notification is transmitted to control device 24 in second vehicle 10b and control device 24 in third vehicle 10c. When receiving the deemed arrival notification, those control devices 24 cause autonomous driving control device 22 in corresponding vehicle 10 not to travel to boarding point 202. As a result, second vehicle 10b and third vehicle 10c are brought into a state for simulating arrival at boarding point 202. In contrast, fourth vehicle 10d is not brought into such a state.

FIG. 4B illustrates a state subsequent to FIG. 4A. First user 90a to third user 90c board first vehicle 10a to third vehicle 10c, respectively. At this moment, even when first vehicle 10a departs, second vehicle 10b and third vehicle 10c do not move forward. First vehicle 10a to third vehicle 10c finally depart. FIG. 4C illustrates a state subsequent to FIG. 4B. Since first vehicle 10a to third vehicle 10c have departed, first space 210a described above is unoccupied. Sensor 30 of fourth vehicle 10d is caused not to detect preceding vehicle 10, whereby fourth vehicle 10d moves forward and arrives at boarding point 202. Control device 24 in fourth vehicle 10d arrived at boarding point 202 transmits the arrival notification to management apparatus 12.

FIG. 5 illustrates a detailed configuration of management system 100. Herein, to make contents of processing clear, only control device 24 in vehicle 10 is illustrated. However management system 100 includes management apparatus 12, mobile terminal device 14, and control device 24.

Management apparatus 12 includes vehicle dispatch unit 40, instruction unit 42, management unit 44, first receiver 46, second receiver 48, transmitter 50, and reception unit 52. Management unit 44 includes first acquiring unit 60, second acquiring unit 62, and selection unit 64. Control device 24 includes reception unit 70, controller 72, first transmitter 74, second transmitter 76, receiver 78, and reporting unit 80.

Vehicle dispatch unit 40 of management apparatus 12 determines boarding point 202 toward which vehicle 10 travels. Any publicly known technique only needs to be used for such determination processing, and thus description of the processing will be omitted herein. Vehicle dispatch unit 40 outputs information on boarding point 202 thus determined to instruction unit 42 and management unit 44. Instruction unit 42 generates instruction notification including the information on boarding point 202 from vehicle dispatch unit 40, and transmits the instruction notification to control device 24. Management unit 44 receives the information on boarding point 202 from vehicle dispatch unit 40, and manages boarding point 202 toward which vehicle 10 travels.

Reception unit 70 of control device 24 receives the instruction notification from management apparatus 12, and outputs boarding point 202 included in the instruction notification to controller 72. Controller 72 receives boarding point 202 from reception unit 70, and acquires the current location from location information acquisition unit 28 (not illustrated). Controller 72 generates a travelling route from the current location to boarding point 202. Controller 72 instructs autonomous driving control device 22 (not illustrated) to travel along the travelling route. As a result, vehicle 10 travels along the travelling route to boarding point 202.

During travelling of vehicle 10, controller 72 periodically acquires the current location from location information acquisition unit 28 to confirm whether vehicle 10 approaches boarding point 202. In a case where the acquired current location enters boarding area 200 along the travelling route, and coincides with boarding point 202, controller 72 confirms that vehicle 10 arrives at boarding point 202. Upon confirming that vehicle 10 arrives at boarding point 202, controller 72 instructs first transmitter 74 to process. When receiving the instruction from controller 72, first transmitter 74 transmits the arrival notification to management apparatus 12. This corresponds to transmitting the arrival notification when vehicle 10 arrives at boarding point 202 to be allocated at the leading portion in boarding area 200, which is the above-described first processing.

On the other hand, in a case where the acquired current location enters boarding area 200 along the travelling route, but stops before arriving at boarding area 202, controller 72 instructs second transmitter 76 to process. When receiving the instruction from controller 72, second transmitter 76 transmits the pre-arrival notification to management apparatus 12. This corresponds to transmitting the pre-arrival notification when vehicle 10 stops before arriving at boarding point 202 in boarding area 200. Also after transmitting the pre-arrival notification, controller 72 periodically acquires the current location from location information acquisition unit 28 to confirm whether vehicle 10 approaches boarding point 202.

As a result, after second transmitter 76 transmits the pre-arrival notification, in a case where vehicle 10 arrives at boarding point 202 before receiver 78 to be described later receives the deemed arrival notification, controller 72 instructs first transmitter 74 to process. When receiving the instruction from controller 72, first transmitter 74 transmits the arrival notification to management apparatus 12. Such two-stage transmission including the pre-arrival notification and the arrival notification corresponds to the above-described second processing. Note that, during periodical acquisition of the current location from location information acquisition unit 28, controller 72 causes first transmitter 74 or second transmitter 76 to transmit at least part of the current location to management apparatus 12.

First receiver 46 of management apparatus 12 receives the arrival notification or the pre-arrival notification from control device 24. First receiver 46 also receives the current location from control device 24. First receiver 46 outputs those pieces of information thus received to management unit 44.

Management unit 44 confirms vehicles 10 stopping in boarding area 200 based on the arrival notification, the pre-arrival notification, and the current location, which are received from first receiver 46. For example, management unit 44 confirms vehicle 10 arrived at boarding point 202 based on the arrival notification from one vehicle 10 at this moment. Management unit 44 also confirms vehicles 10 that have entered boarding area 200 but do not arrive at boarding point 202, and order of those vehicles 10, based on the pre-arrival notification and the current locations from one or more vehicles 10. For example, as illustrated in FIG. 3A, when receiving the arrival notification from first vehicle 10a and the pre-arrival notification and the current locations from second vehicle 10b and third vehicle 10c, management unit 44 confirms that first vehicle 10a, second vehicle 10b, and third vehicle 10c queue in this order. If first vehicle 10a departs, management unit 44 receives the arrival notification from second vehicle 10b through first receiver 46. Then management unit 44 confirms that second vehicle 10b and third vehicle 10c queue in this order.

First acquiring unit 60 acquires number M of vehicles 10 stopping in boarding area 200 based on the arrival notification or the pre-arrival notification received by first receiver 46, that is, the order of vehicles 10 confirmed by management unit 44.

Second receiver 48 receives the boarding request notification from mobile terminal device 14 used by user 90. User 90 can be regarded as user 90 who requests to board vehicle 10 at boarding point 202. Second receiver 48 outputs the boarding request notification to management unit 44. Second acquiring unit 62 receives the boarding request notification from second receiver 48. Second acquiring unit 62 acquires a number of vehicles 10 that are requested for boarding, by accumulating the boarding request notification. Note that, as described above, assuming that one user 90 boards one vehicle 10, the number of vehicles 10 that are requested for boarding corresponds to number N of users 90 at boarding point 202. When a plurality of vehicles 10 can be requested for boarding through one piece of the boarding request notification, the boarding request notification includes information on the number of vehicles 10. Second acquiring unit 62 acquires number N of vehicles 10 that are requested for boarding, by accumulating the information on the number of vehicles 10.

Selection unit 64 receives number N acquired in second acquiring unit 62 and number M acquired in first acquiring unit 60. When both number N and number M are plural, selection unit 64 selects a smaller number. Herein, the selected number is indicated as "C". Management unit 44 determines transmission of the deemed arrival notification to control device 24 of each of second vehicle 10 to "C"-th vehicle 10 based on number "C" selected in selection unit 64.

Transmitter 50 transmits the deemed arrival notification to control device 24 of each of second vehicle 10 to "C"-th vehicle 10. This correspond to transmission of the deemed arrival notification to control device 24 from which the arrival notification have not received among vehicles 10 of number "C" selected in selection unit 64, which queue in order from the leading portion in boarding area 200.

Receiver 78 of control device 24 of each of second vehicle 10 to "C"-th vehicle 10 receives the deemed arrival notification. In particular, the deemed arrival notification is received when first transmitter 74 does not receive the arrival notification after second transmitter 76 has transmitted the pre-arrival notification. Receiver 78 notifies controller 72 of reception of the deemed arrival notification. Controller 72 aborts transmission of the arrival notification when receiver 78 receives the deemed arrival notification after second transmitter 76 has transmitted the pre-arrival notification. Further, controller 72 instructs autonomous driving control device 22 to cause vehicle 10 not to travel to boarding point 202. In this way, the processing for transmitting the pre-arrival notification and then receiving the deemed arrival notification corresponds to the above-described third processing.

Controller 72 detects the fact that user 90 boards vehicle 10 after any one of the first to third processing is terminated. This fact is acquired by user 90 setting the destination in vehicle 10. When detecting the boarding, controller 72 causes reporting unit 80 to perform processing. When receiving the instruction from controller 72, reporting unit 80 transmits the boarding report to management apparatus 12.

Reception unit 52 of management apparatus 12 receives the boarding report from control device 24. Reception unit 52 outputs the boarding report to management unit 44. When receiving the boarding report, management unit 44 subtracts one from both number N and number M. This indicates completion of dispatching vehicle 10 to one user 90.

These configurations can be implemented using a central processing unit (CPU), a memory, and other large scale integration (LSI) of any given computer in terms of hardware and using a program loaded in the memory in terms of software. The drawings herein illustrate functional blocks achieved through coordination of these components. Hence, it will be understood by those skilled in the art that these functional blocks can be achieved in various forms by the hardware alone or by combinations of the hardware and the software. Further, these functional blocks can also be implemented as a physical circuit such as a dedicated integrated circuit (IC) or the LSI.

Figure 6:
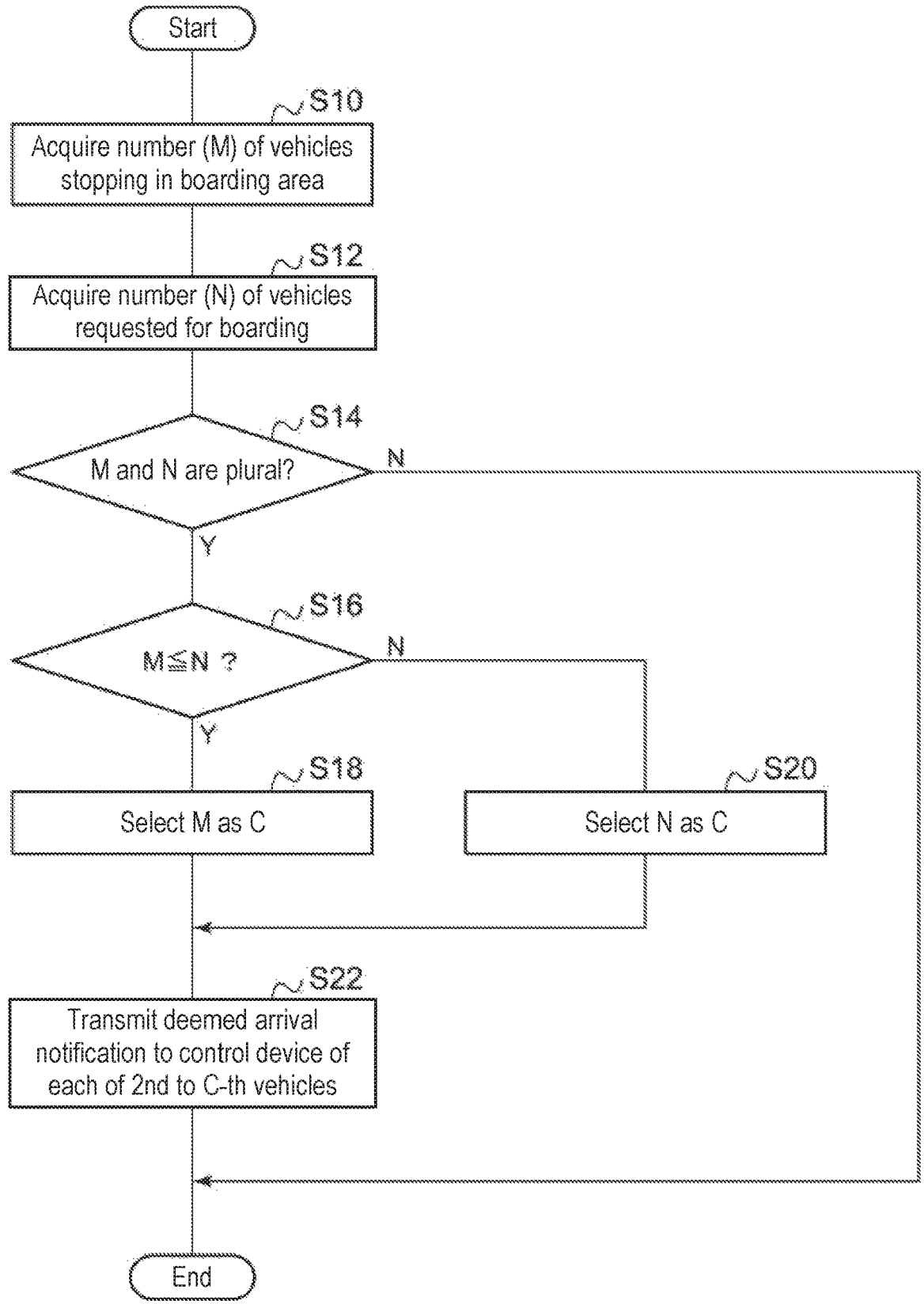
FIG. 6 is a flowchart illustrating a management procedure performed by a management apparatus in FIG. 1.

An operation of management system 100 having the above configuration will be described. FIG. 6 is a flowchart illustrating a management procedure performed by management apparatus 12. First acquiring unit 60 acquires number (M) of vehicles 10 stopping in boarding area 200 (S10). Second acquiring unit 62 acquires number (N) of vehicles requested for boarding (S12). When M and N are plural (Y in S14), and M≤N is satisfied (Y in S16), selection unit 64 selects M as C (S18). When M≤N is not satisfied (N in S16), selection unit 64 selects N as C (S20). Transmitter 50 transmits the deemed arrival notification to control device 24 of each of second to C-th vehicles 10 (S22). When M and N are not plural (N in S14), the process is terminated.

Figure 7:
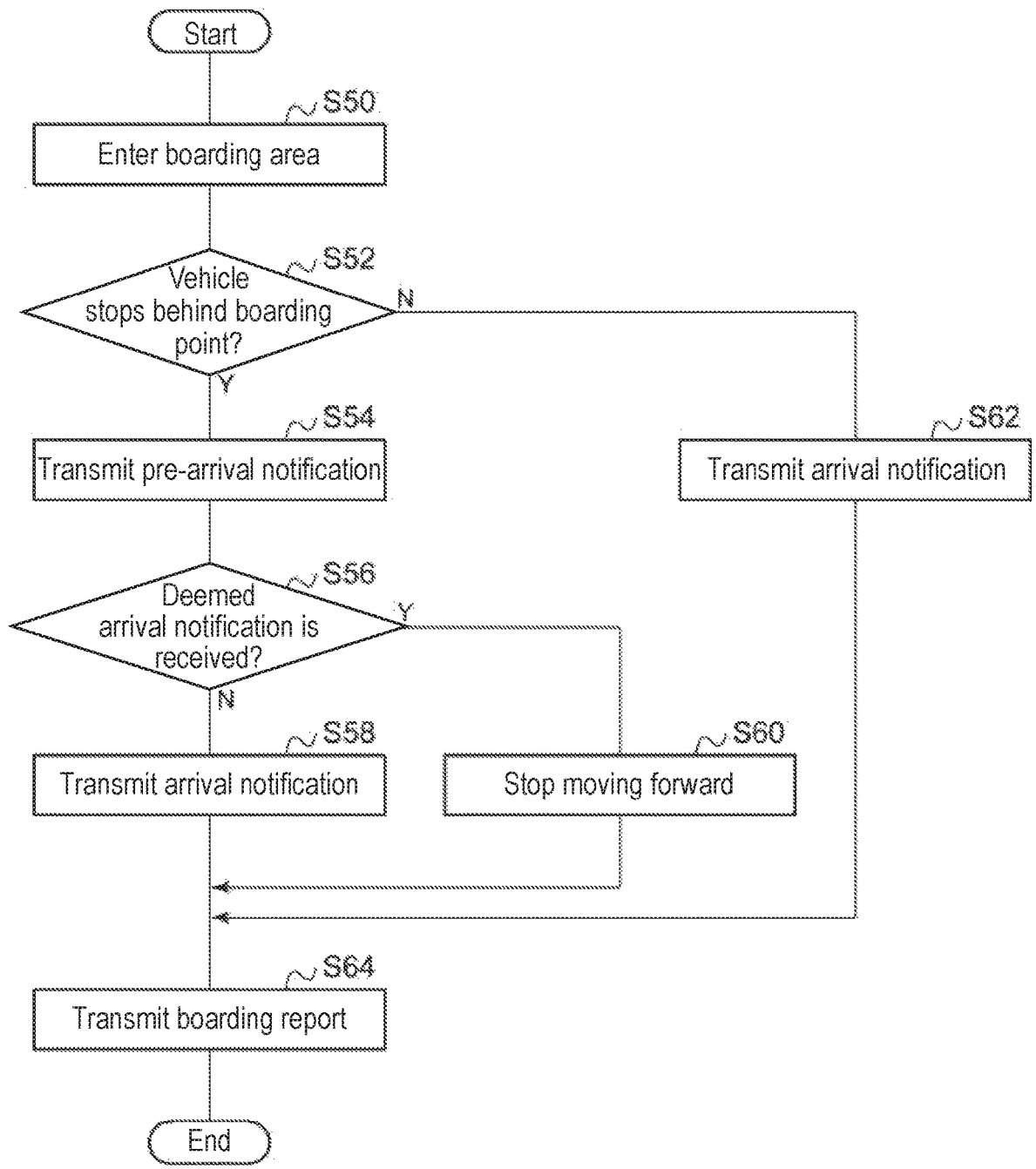
FIG. 7 is a flowchart illustrating a control procedure performed by a control device in FIG. 1.

FIG. 7 is a flowchart illustrating a control procedure to be performed by control device 24 in vehicle 10. When vehicle 10 enters boarding area 200 (S50) and stops behind boarding point 202 (Y in S52), second transmitter 76 transmits the pre-arrival notification (S54). When receiver 78 does not receive the deemed arrival notification (N in S56), first transmitter 74 transmits the arrival notification (S58). When receiver 78 receives the deemed arrival notification (Y in S56), controller 72 causes autonomous driving control device 22 to stop moving forward (S60). When vehicle 10 does not stop behind boarding point 202 (N in S52), that is, stops at boarding point 202, first transmitter 74 transmits the arrival notification (S62). Reporting unit 80 then transmits the boarding report (S64).

According to the first exemplary embodiment of the present disclosure, the arrival notification is received from the control device of the vehicle arrived at the boarding point, and the pre-arrival notification is received from the control device of the vehicle that enters the boarding area and does not arrive at the boarding point. This enables confirmation of the number of vehicles stopping in the boarding area. The smaller one of the number of vehicles stopping in the boarding area and the number of vehicles requested for boarding is selected. This enables confirmation of a number of vehicles that allows a plurality of users to simultaneously board the vehicles in the boarding area. The deemed arrival notification is transmitted to the control device of each of the vehicles other than the leading vehicle among the vehicles that allow simultaneous boarding. This can cause the vehicles to stop moving to the boarding point. The vehicles are caused to stop moving to the boarding point, whereby safe vehicle boarding can be achieved. The arrival notification or the pre-arrival notification is transmitted according to the situation, whereby the management apparatus can be informed of the situation of the vehicles. Even when the vehicle does not arrive at the boarding point, if the deemed arrival notification is received, the vehicle is caused to stop moving to the boarding point, whereby safe vehicle boarding can be achieved.

Second Exemplary Embodiment

A second exemplary embodiment is a modification of the first exemplary embodiment. In the second exemplary embodiment, configurations identical to or corresponding to the configurations in the first exemplary embodiment are attached with the same reference signs as the first exemplary embodiment, and repetitive description will be omitted. It is assumed that contents that are not specifically described are the same as those in the first exemplary embodiment. Boarding area 200 used as a basic requirement is assumed to be the same as that in the first exemplary embodiment. For example, a plurality of vehicles 10 stands by in boarding area 200 at least in a single file (queue), and can accept boarding of a user at least at a leading portion in the file.

Figure 8:
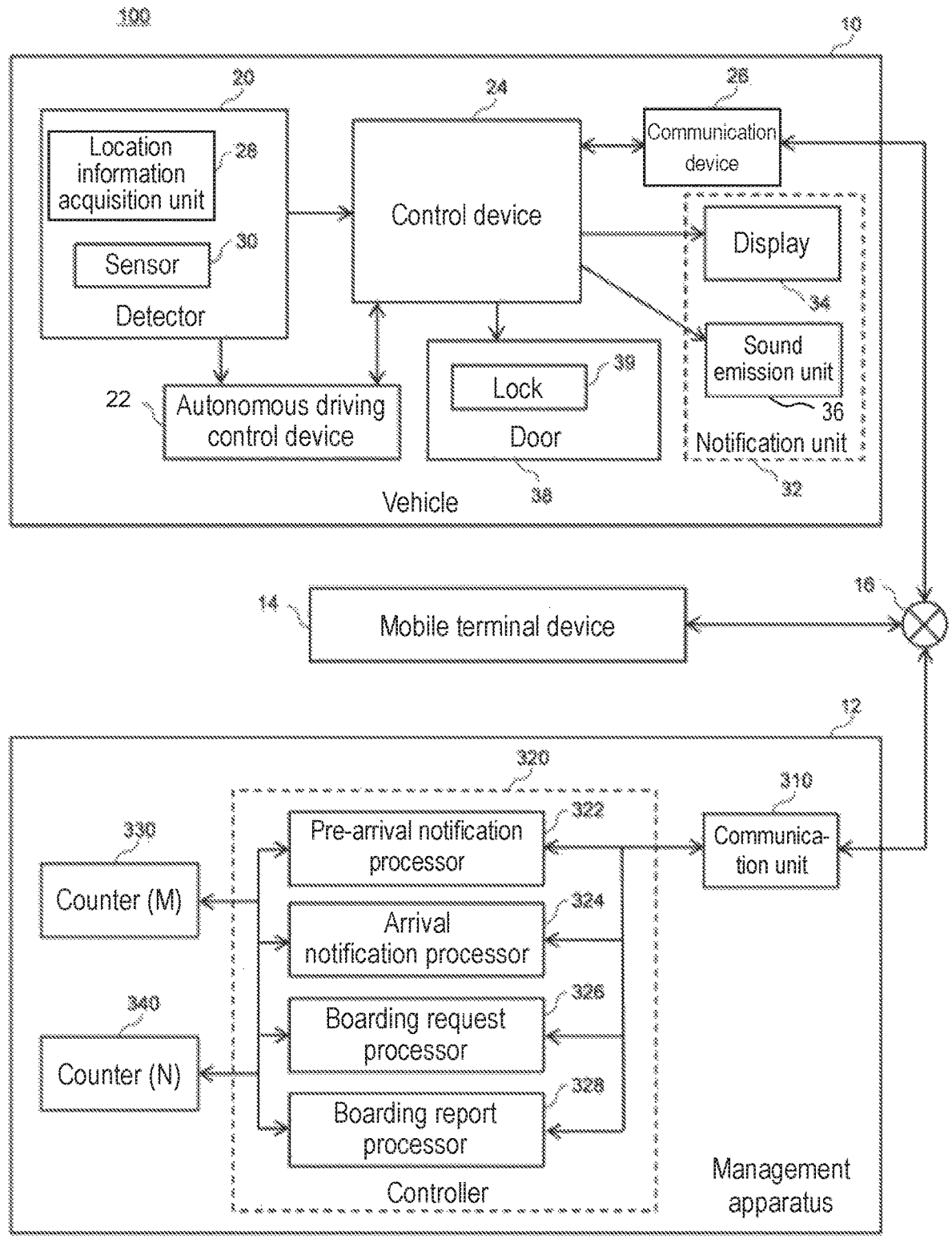
FIG. 8 illustrates a configuration of a management system according to a second exemplary embodiment.
Figure 9A:
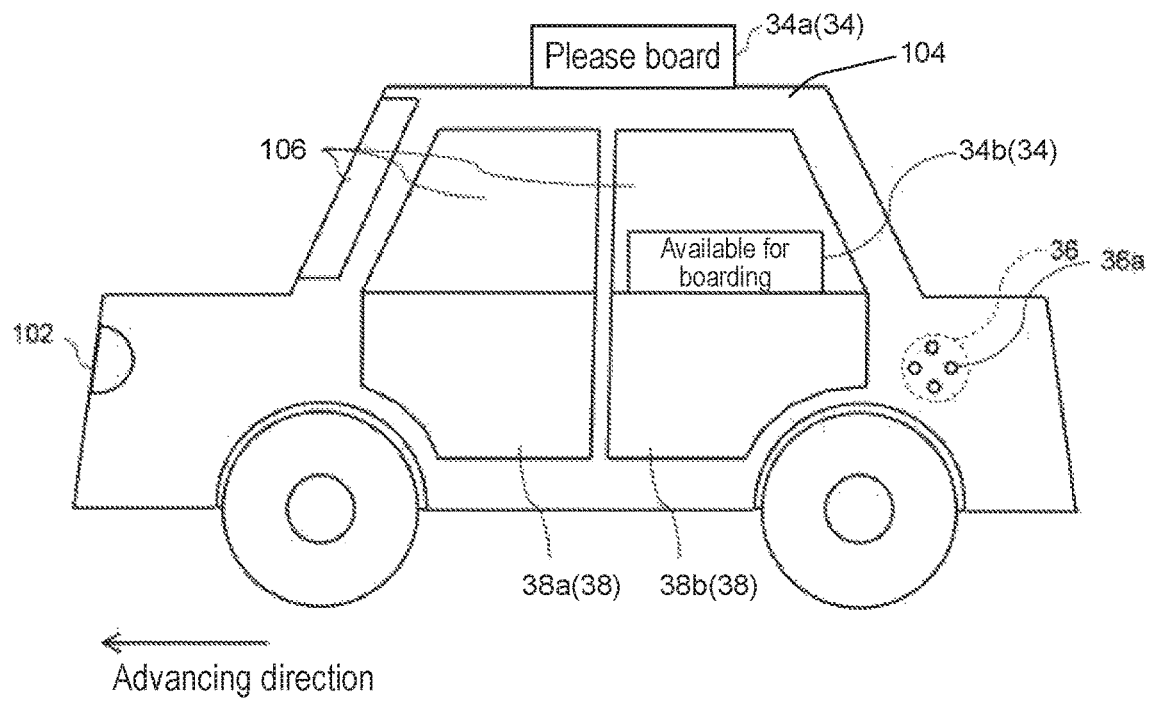
FIG. 9A schematically illustrates an external appearance of a vehicle in a state in which displays display that boarding is available, according to the second exemplary embodiment.
Figure 9B:
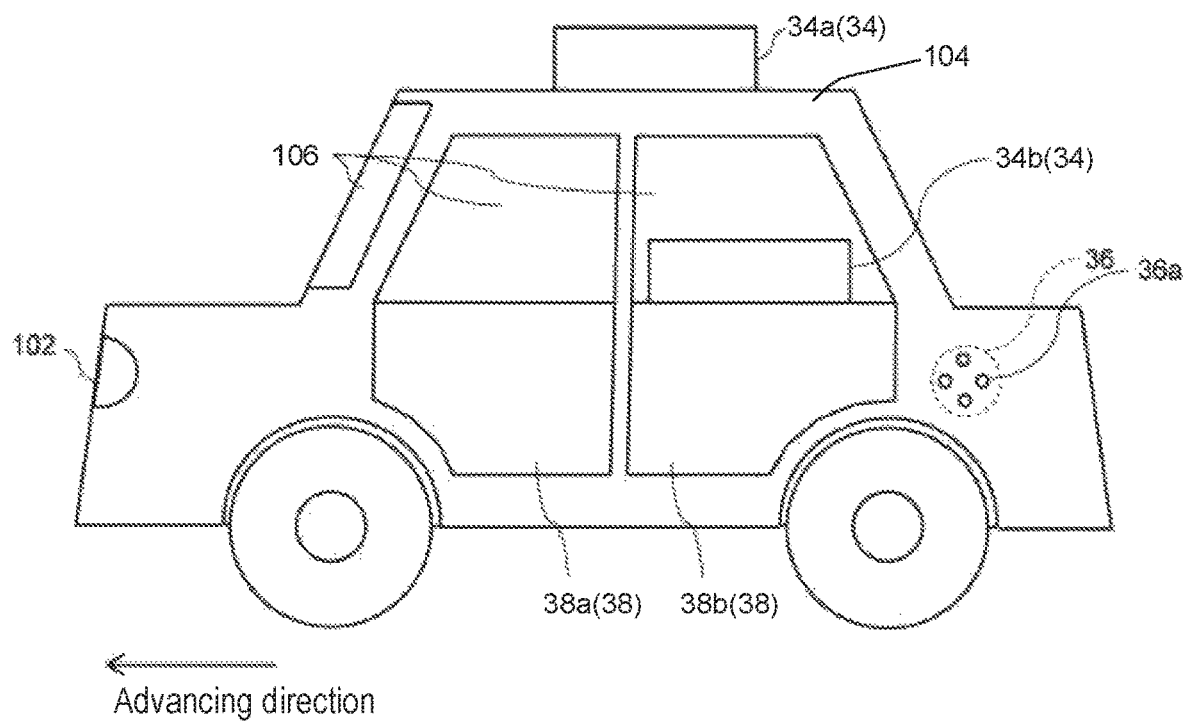
FIG. 9B schematically illustrates an external appearance of the vehicle in a state in which the displays do not display that boarding is available, according to the second exemplary embodiment.

With reference to FIGS. 8, 9A, and 9B, a configuration of management system 100 according to the second exemplary embodiment of the present disclosure will be described herein. FIG. 8 illustrates the configuration of management system 100 according to the second exemplary embodiment of the present disclosure. As illustrated in FIG. 8, management system 100 includes vehicle 10, management apparatus 12, mobile terminal device 14, and network 16, similar to the first exemplary embodiment. FIGS. 9A and 9B schematically illustrate an external appearance of vehicle 10 according to the second exemplary embodiment.

Vehicle 10 of the second exemplary embodiment includes detector 20, autonomous driving control device 22, control device 24, and communication device 26, and detector 20 includes location information acquisition unit 28 and sensor 30, similar to vehicle 10 of the first exemplary embodiment. Herein, a number of vehicles 10 and a number of mobile terminal devices 14 are set to be "1", but the numbers may be plural. Vehicle 10 can perform autonomous driving, similar to that in the first exemplary embodiment. Mobile terminal device 14 is a specific example of a communication terminal, and may be installed as a dedicated terminal. A user operates mobile terminal device 14 to generate boarding request notification that is notification for requesting boarding at a boarding point. Mobile terminal device 14 can communicate with management apparatus 12 through network 16. The communication between mobile terminal device 14 and management apparatus 12 may be performed through a server, may be pier-to-pier (P2P) communication, or may be wireless communication. Communication between vehicle 10 and management apparatus 12 may use wireless communication.

Vehicle 10 in the second exemplary embodiment further includes door 38, notification unit 32, roof 104, and headlight 102. Door 38 includes front door 38a and rear door 38b. Headlight 102 is disposed on a front surface of vehicle 10, that is, is disposed at a leading portion along an advancing direction of vehicle 10. Vehicle 10 includes a portion configured with glass 106 including a windshield and an upper portion of door 38 (front door 38a and rear door 38b).

Notification unit 32 can notify the outside of the vehicle of information. Notification unit 32 includes display 34 and sound emission unit 36. Display 34 displays that vehicle 10 is available for boarding so as to be visually recognized from the outside of vehicle 10. As illustrated in FIGS. 9A and 9B, for example, display 34 includes display 34a installed on roof 104 of vehicle 10 and display 34b disposed on an inner side of glass 106 of vehicle 10. An external appearance of vehicle 10 in a state in which displays 34a, 34b display that vehicle 10 is available for boarding is illustrated in the schematic view in FIG. 9A. Displaying that boarding is allowed includes display such as "Please board" and "Boarding is available", for example, as in display on displays 34a, 34b in FIG. 9A. An external appearance of vehicle 10 in a state in which displays 34a, 34b do not display that vehicle 10 is available for boarding is illustrated in the schematic view in FIG. 9B. Note that vehicle 10 may display, on displays 34a, 34b, that boarding is still in preparation, or that boarding is not allowed yet, in place of not displaying that vehicle 10 is available for boarding as in FIG. 9B. More specifically, sound emission unit 36 is a loud speaker. For example, as illustrated in FIGS. 9A and 9B, sound emission unit 36 can emit vocal sound indicating that vehicle 10 is available for boarding toward outside through holes 36a in vehicle 10 as a voice. Note that vehicle 10 may cause sound emission unit 36 to emit sound indicating that boarding is still in preparation, or that boarding is not allowed yet, in place of no sound emission indicating that vehicle 10 is available for boarding.

Door 38 is attached with lock 39. When notification unit 32 send a notification indicating that vehicle 10 is available for boarding, control device 24 unlocks lock 39 of door 38. For example, control device 24 unlocks lock 39 of door 38 within a predetermined time after notification unit 32 starts notifying that vehicle 10 is available for boarding. The predetermined time may be any of one second, five seconds, and ten seconds, for example. Further, for example, control device 24 causes notification unit 32 to start notifying that vehicle 10 is available for boarding within a predetermined time after control device 24 unlocks lock 39 of door 38. The predetermined time may be any of one second, five seconds, and ten seconds, for example.

Management apparatus 12 in the second exemplary embodiment includes communication unit 310, controller 320, and counters 330, 340. Controller 320 includes pre-arrival notification processor 322, arrival notification processor 324, boarding request processor 326, and boarding report processor 328. Counter 330 is a counter for counting number (M) of vehicles 10 in boarding area 200. Counter 340 is a counter for counting number (N) of boarding requests corresponding to boarding area 200. Number (N) of boarding requests is a numerical value calculated by subtracting the number of boarding reports from a number of boarding request notifications.

When receiving arrival notification from vehicle 10 through communication unit 310, arrival notification processor 324 increments (adds one to) a count of number (M) of vehicles 10 in counter 330, and transmits an arrival notification response to vehicle 10 through communication unit 310. The arrival notification is notification in which vehicle 10 notifies management apparatus 12 of the fact that vehicle 10 arrives in boarding area 200 and its stop position (location) is a first position. The arrival notification response is notification in which management apparatus 12 notifies vehicle 10 of the fact that reception of the arrival notification is succeeded, that is, acknowledgement (ACK). The arrival notification response includes a case where boarding instruction is included and a case where the boarding instruction is not included. Specifically, in a case where a count of the number of boarding requests is greater than or equal to a count of the number of vehicles 10 (that is, N≥M is satisfied) when the arrival notification is received, the arrival notification response including the boarding instruction is transmitted. In contrast, in a case where the count of the number of boarding requests is less than the count of the number of vehicles 10 (that is, N<M is satisfied) when the arrival notification is received, the arrival notification response excluding the boarding instruction is transmitted. The boarding instruction is notification in which management apparatus 12 notifies vehicle 10 of an instruction for allowing the user to board vehicle 10.

When receiving pre-arrival notification from vehicle 10 through communication unit 310, pre-arrival notification processor 322 increments (adds one to) the count of number (M) of vehicles 10 in counter 330, and transmits a pre-arrival notification response to vehicle 10 through communication unit 310. The pre-arrival notification is notification in which vehicle 10 notifies management apparatus 12 of the fact that vehicle 10 arrives in boarding area 200 and its stop position is, for example, a second position, a third position, or a fourth position other than the first position. The pre-arrival notification response is notification in which management apparatus 12 notifies vehicle 10 of the fact that reception of the pre-arrival notification is succeeded, that is, ACK. The pre-arrival notification response includes a case where the boarding instruction is included and a case where the boarding instruction is not included. Specifically, in a case where the count of the number of boarding requests is greater than or equal to the count of the number of vehicles 10 (that is, N≥M is satisfied) when the pre-arrival notification is received, the pre-arrival notification response including the boarding instruction is transmitted. The pre-arrival notification response including the boarding instruction is also referred to as "deemed arrival notification". In contrast, in a case where the count of the number of boarding requests is less than the count of the number of vehicles 10 (that is, N<M is satisfied) when the pre-arrival notification is received, the pre-arrival notification response excluding the boarding instruction is transmitted.

When receiving the boarding request notification from mobile terminal device 14 through communication unit 310, boarding request processor 326 increments (adds one to) the count of number (N) of boarding requests in counter 340, and transmits a boarding request notification response to mobile terminal device 14 through communication unit 310. The boarding request notification is notification in which mobile terminal device 14 notifies management apparatus 12 of the fact that the user who requests to board one vehicle 10 from boarding area 200 is present. The boarding request notification response is notification in which management apparatus 12 notifies mobile terminal device 14 of the fact that reception of the boarding request notification is succeeded, that is, ACK. The count of the number of vehicles 10 is greater than or equal to the count of the number of boarding requests (that is, M≥N is satisfied) when the boarding request notification is received, boarding request processor 326 transmits the boarding instruction to vehicle 10 through communication unit 310.

When receiving the boarding report from vehicle 10 through communication unit 310, boarding report processor 328 decrements (subtracts one from) the count of number (M) of vehicles 10 in counter 330, decrements (subtracts one from) the count of number (N) of boarding requests in counter 340, and transmits the boarding report response to vehicle 10 through communication unit 310. The boarding report is notification in which vehicle 10 notifies management apparatus 12 of the fact that vehicle 10 completes boarding of the user. The boarding report response is notification in which management apparatus 12 notifies vehicle 10 of the fact that reception of the boarding report is succeeded, that is, ACK.

Examples of mobile terminal device 14 in the second exemplary embodiment include a mobile phone terminal, a smartphone, and a tablet terminal, which are carried by a user, similar to mobile terminal device 14 in the first exemplary embodiment. Note that mobile terminal device 14 may be installed as a dedicated terminal near the boarding point. The user operates mobile terminal device 14 to generate notification for requesting boarding at the boarding point (hereinafter, referred to as "boarding request notification"). Mobile terminal device 14 transmits the boarding request notification to management apparatus 12 through network 16.

Similar to the first exemplary embodiment, these configurations of control device 24 and controller 320 of management system 100 in the second exemplary embodiment can be implemented using a CPU, a memory, and other LSI of any given computer in terms of hardware and using a program loaded in the memory in terms of software. The drawings herein illustrate functional blocks achieved through coordination of these components. Hence, it will be understood by those skilled in the art that these functional blocks can be achieved in various forms by the hardware alone or by combinations of the hardware and the software. Further, these functional blocks can also be implemented as a physical circuit such as a dedicated IC or the LSI.

Figure 10:
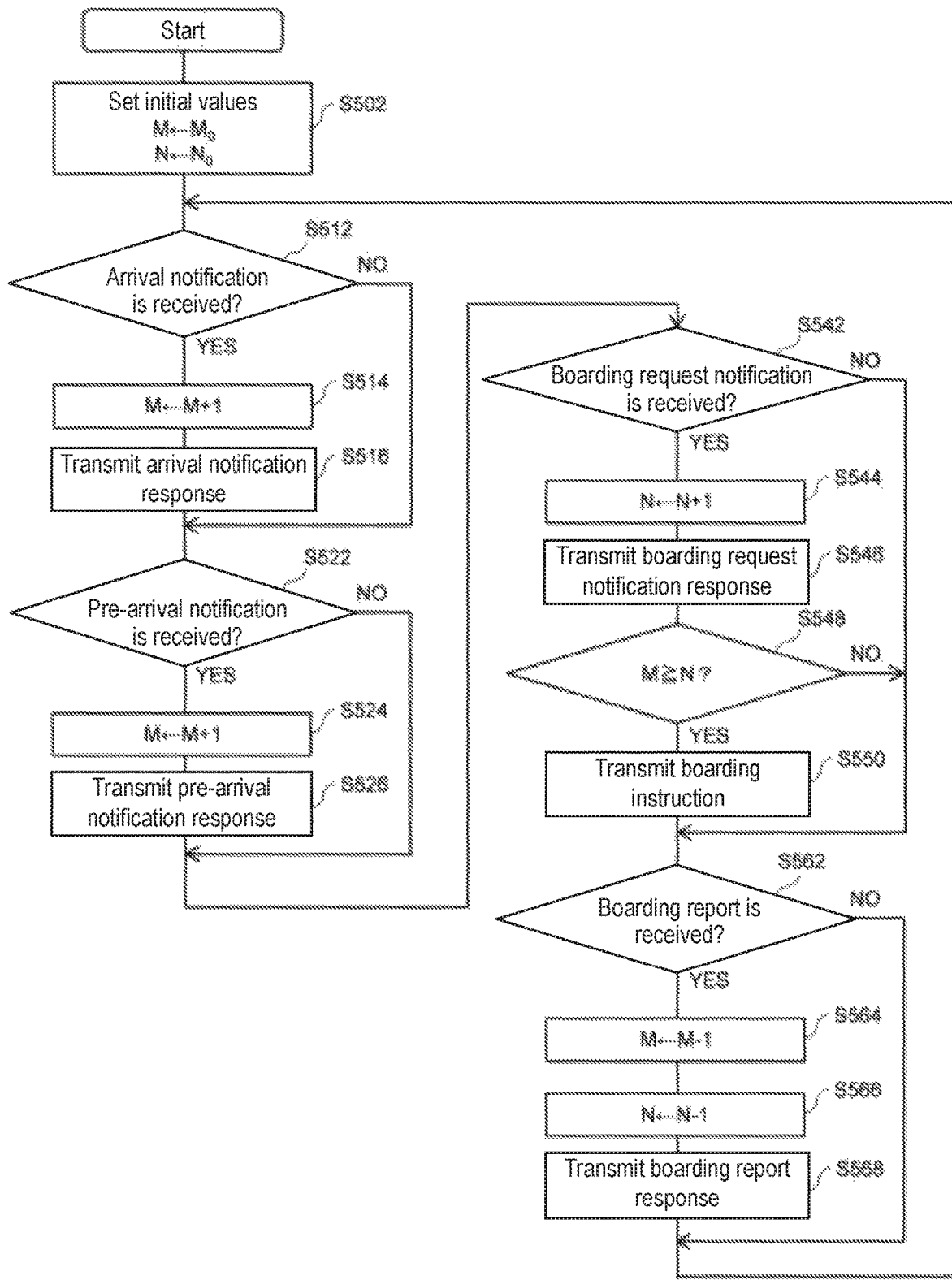
FIG. 10 is a flowchart illustrating processing in a management apparatus according to the second exemplary embodiment.

FIG. 10 is a flowchart illustrating the processing in management apparatus 12 according to the second exemplary embodiment. When management apparatus 12 is activated, as illustrated in step S502 in FIG. 10, controller 320 of management apparatus 12 sets initial values in the count of number (M) of vehicles 10 in counter 330 and the count of number (N) of boarding requests in counter 340. In other words, $M=M_0$ and $N=N_0$ are set as the initial values. For example, when no vehicle 10 is present in boarding area 200 and the boarding request is not received, 0 (zero) is set as the count of number (M) of vehicles 10 in counter 330, and 0 (zero) is set as the count of number (N) of boarding requests in counter 340.

Next, arrival notification processor 324 determines whether the arrival notification is received from vehicle 10 through communication unit 310 (step S512). When receiving arrival notification from vehicle 10 through communication unit 310 (step S512: YES), arrival notification processor 324 increments (adds one to) the count of number (M) of vehicles 10 in counter 330 (step S514), and transmits the arrival notification response to vehicle 10 through communication unit 310 (step S516). The arrival notification response includes a case where boarding instruction is included and a case where the boarding instruction is not included. Specifically, in a case where the count of the number of boarding requests is greater than or equal to the count of the number of vehicles 10 (that is, N≥M is satisfied) when the arrival notification is received, the arrival notification response including the boarding instruction is transmitted. In contrast, in a case where the count of the number of boarding requests is less than the count of the number of vehicles 10 (that is, N<M is satisfied) when the arrival notification is received, the arrival notification response excluding the boarding instruction is transmitted. When the arrival notification is not received from vehicle 10 through communication unit 310 (step S512: NO), processes in steps S514 and S516 are skipped.

Next, pre-arrival notification processor 322 determines whether the pre-arrival notification is received from vehicle 10 through communication unit 310 (step S522). When receiving pre-arrival notification from vehicle 10 through communication unit 310 (step S522: YES), pre-arrival notification processor 322 increments (adds one to) the count of number (M) of vehicles 10 in counter 330 (step S524), and transmits the pre-arrival notification response to vehicle 10 through communication unit 310 (step S526). The pre-arrival notification response includes a case where the boarding instruction is included and a case where the boarding instruction is not included. Specifically, in a case where the count of the number of boarding requests is greater than or equal to the count of the number of vehicles 10 (that is, N≥M is satisfied) when the pre-arrival notification is received, the pre-arrival notification response including the boarding instruction is transmitted. The pre-arrival notification response including the boarding instruction is also referred to as "deemed arrival notification". In contrast, in a case where the count of the number of boarding requests is less than the count of the number of vehicles 10 (that is, N<M is satisfied) when the pre-arrival notification is received, the pre-arrival notification response excluding the boarding instruction is transmitted. When the pre-arrival notification is not received from vehicle 10 through communication unit 310 (step S522: NO), processes in steps S524 and S526 are skipped.

Next, boarding request processor 326 determines whether the boarding request notification is received from mobile terminal device 14 through communication unit 310 (step S542). When receiving the boarding request notification from mobile terminal device 14 through communication unit 310 (step S542: YES), boarding request processor 326 increments (adds one to) the count of number (N) of boarding requests in counter 340 (step S544), and transmits the boarding request notification response to mobile terminal device 14 through communication unit 310 (step S546). In a case where the count of the number of vehicles 10 is greater than or equal to the count of the number of boarding requests (that is, M≥N is satisfied) when the boarding request notification is received (step S548: YES), boarding request processor 326 transmits the boarding instruction to vehicle 10 through communication unit 310 (step S550). When the boarding request notification is not received from mobile terminal device 14 through communication unit 310 (step S542: NO), processes in steps S544, S546, S548, and S550 are skipped. In a case where the count of the number of vehicles 10 is less than the count of the number of boarding requests (that is, M<N is satisfied) when the boarding request notification is received (step S548: NO), the process in step S550 is skipped.

Next, boarding report processor 328 determines whether the boarding report is received from vehicle 10 through communication unit 310 (step S562). When receiving the boarding report from vehicle 10 through communication unit 310 (step S562: YES), boarding report processor 328 decrements (subtracts one from) the count of number (M) of vehicles 10 in counter 330 (step S564), decrements (subtracts one from) the count of number (N) of boarding requests in counter 340 (step S566), and transmits the boarding report response to vehicle 10 through communication unit 310 (step S568). When the boarding report is not received from vehicle 10 through communication unit 310 (step S562: NO), the processes in steps S564, S566, and S568 are skipped.

Note that, in the flowchart in FIG. 10, an example in which arrival notification processor 324, pre-arrival notification processor 322, boarding request processor 326, and boarding report processor 328 perform processes in the above-described order is described. However the order of those processes is not limited to this example. For example, when communication unit 310 receives various pieces of notification, interrupts may be generated in this receiving order, and a corresponding block among arrival notification processor 324, pre-arrival notification processor 322, boarding request processor 326, and boarding report processor 328 may be performed in this order.

Figure 11:
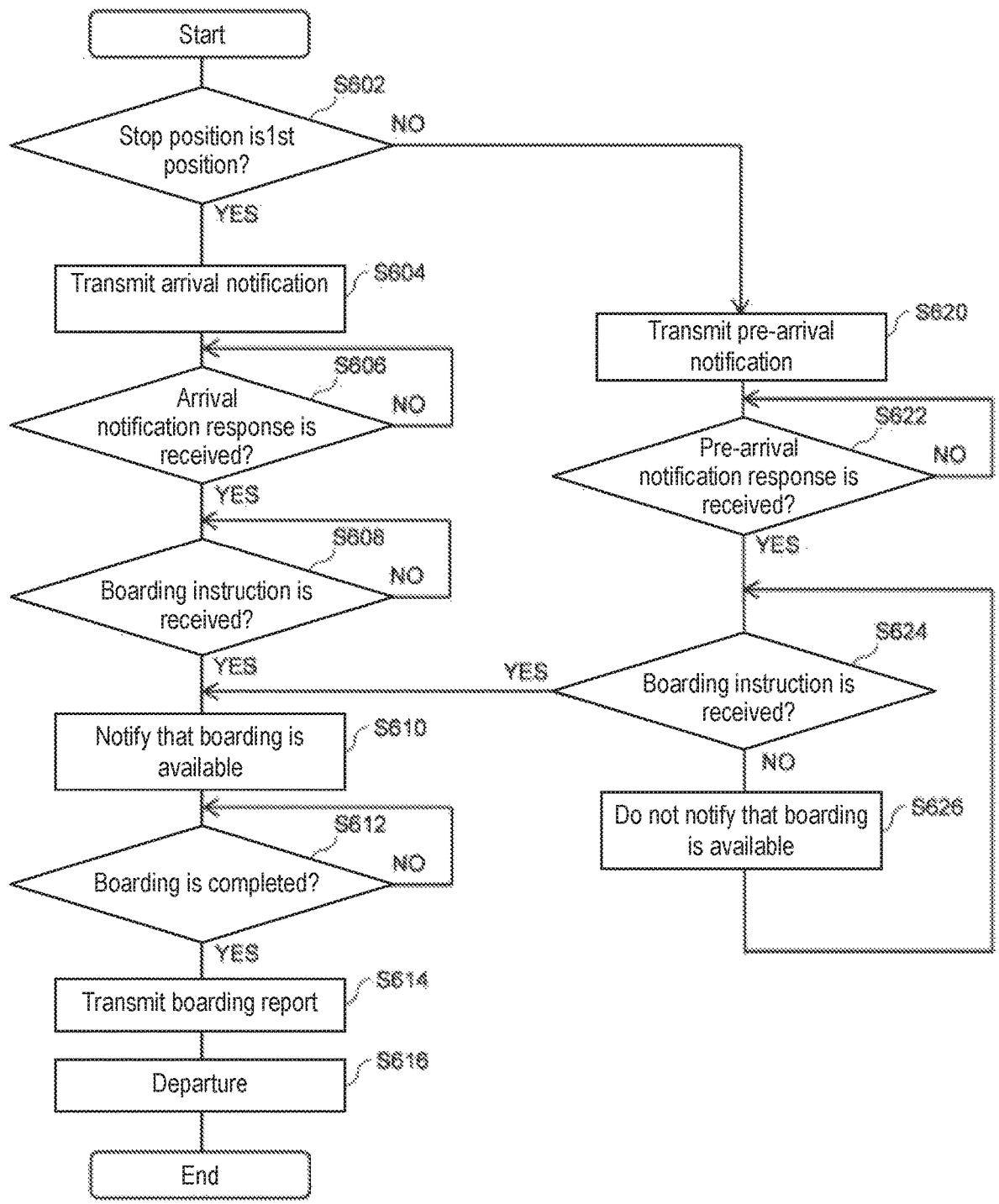
FIG. 11 is a flowchart illustrating processing in the vehicle according to the second exemplary embodiment.

FIG. 11 is a flowchart illustrating the processing in vehicle 10 according to the second exemplary embodiment. When vehicle 10 arrives in boarding area 200, control device 24 determines whether the stop position is the first position (step S602). The determination method of whether the stop position of vehicle 10 is the first position is the same as that of the first exemplary embodiment. When the stop position is the first position (step S602: YES), control device 24 transmits the arrival notification to management apparatus 12 through communication device 26 (step S604). Next, control device 24 determines whether control device 24 has received the arrival notification response from management apparatus 12 through communication device 26 (step S606). When the arrival notification response has not been received (step S606: NO), the process in step S606 is repeated at predetermined intervals. When the arrival notification response has been received (step S606: YES), control device 24 determines whether the boarding instruction has been received from management apparatus 12 through communication device 26 (step S608). As described above, the boarding instruction may be included in the received arrival notification response, or may be received as notification different from the arrival notification response. When the boarding instruction has not been received (step S608: NO), the process in step S608 is repeated at predetermined intervals. When receiving the boarding instruction (step S608: YES), control device 24 causes notification unit 32 to send a notification indicating that boarding is available (step S610). Next, control device 24 determines whether boarding is completed (step S612). When the boarding is not completed (step S612: NO), the process in step S612 is repeated at predetermined intervals. When the boarding is completed (step S612: YES), control device 24 transmits the boarding report to management apparatus 12 through communication device 26 (step S614). Next, control device 24 causes vehicle 10 to depart through the autonomous driving control device (step S616). Vehicle 10 then departs from boarding area 200, and the processes are terminated.

In step S602, when vehicle 10 arrives in boarding area 200, but its stop position is not the first position (step S602: NO), control device 24 transmits the pre-arrival notification to management apparatus 12 through communication device 26 (step S620). Next, control device 24 determines whether control device 24 has received the pre-arrival notification response from management apparatus 12 through communication device 26 (step S622). When the pre-arrival notification response is not received (step S622: NO), the process in step S622 is repeated at predetermined intervals. When receiving the pre-arrival notification response (step S622: YES), control device 24 determines whether control device 24 has received the boarding instruction from management apparatus 12 through communication device 26. The boarding instruction may be included in the pre-arrival notification response, or may be received as notification different from the pre-arrival notification response. The pre-arrival notification response including the boarding instruction is referred to as deemed arrival notification (step S624). When the boarding instruction is received (step S624: YES), the process in step S610 is performed. When the boarding instruction is not received (step S624: NO), control device 24 causes notification unit 32 not to send a notification indicating that boarding is available (step S626). In step S626, control device 24 may cause notification unit 32 to notify that boarding is still in preparation, or that boarding is not allowed yet. After the process in step S626, the process in step S624 is performed at predetermined intervals.

Figure 12:
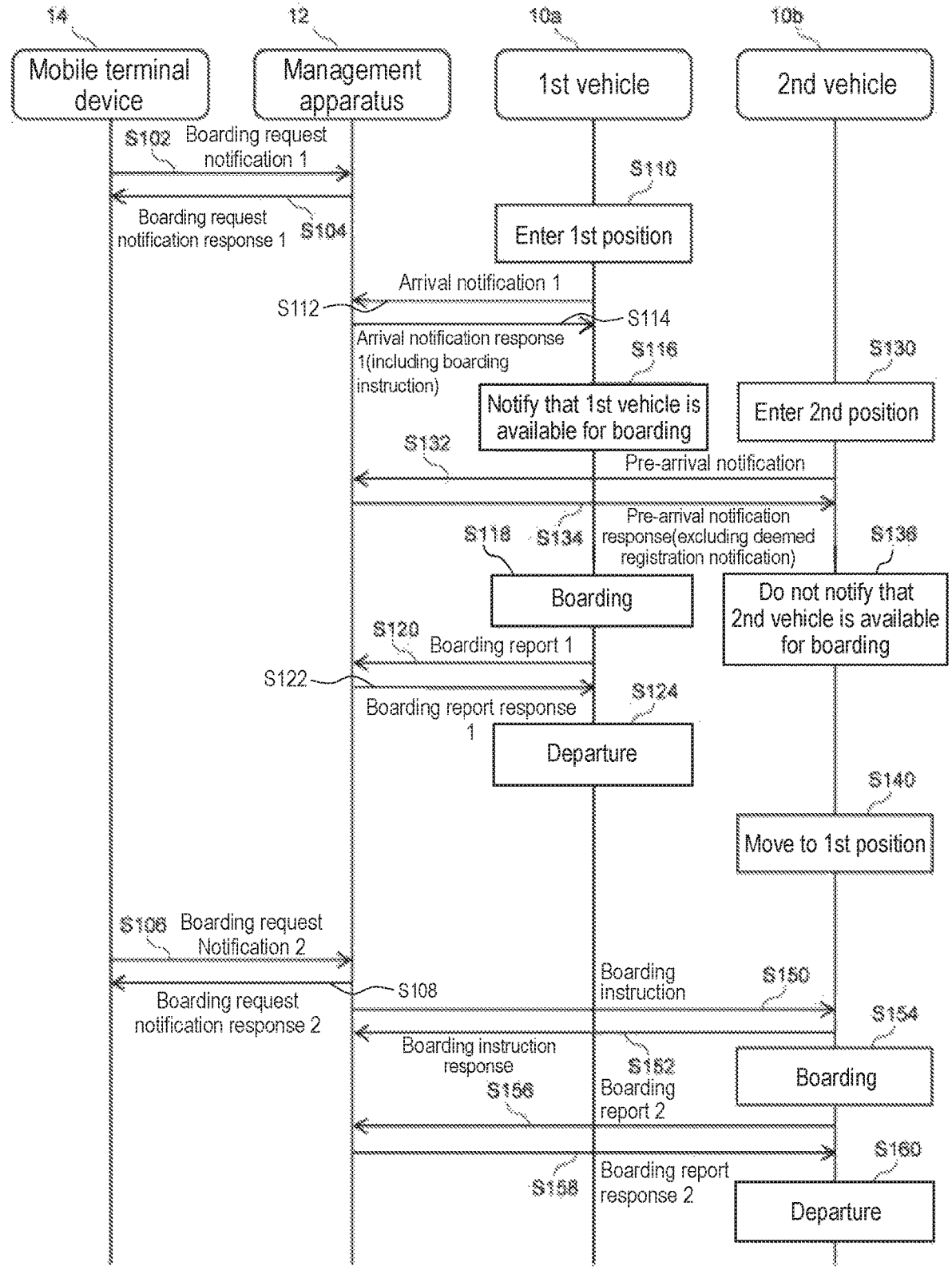
FIG. 12 is a sequence diagram for describing an operation of management system 100 according to the second exemplary embodiment.
Figure 13:
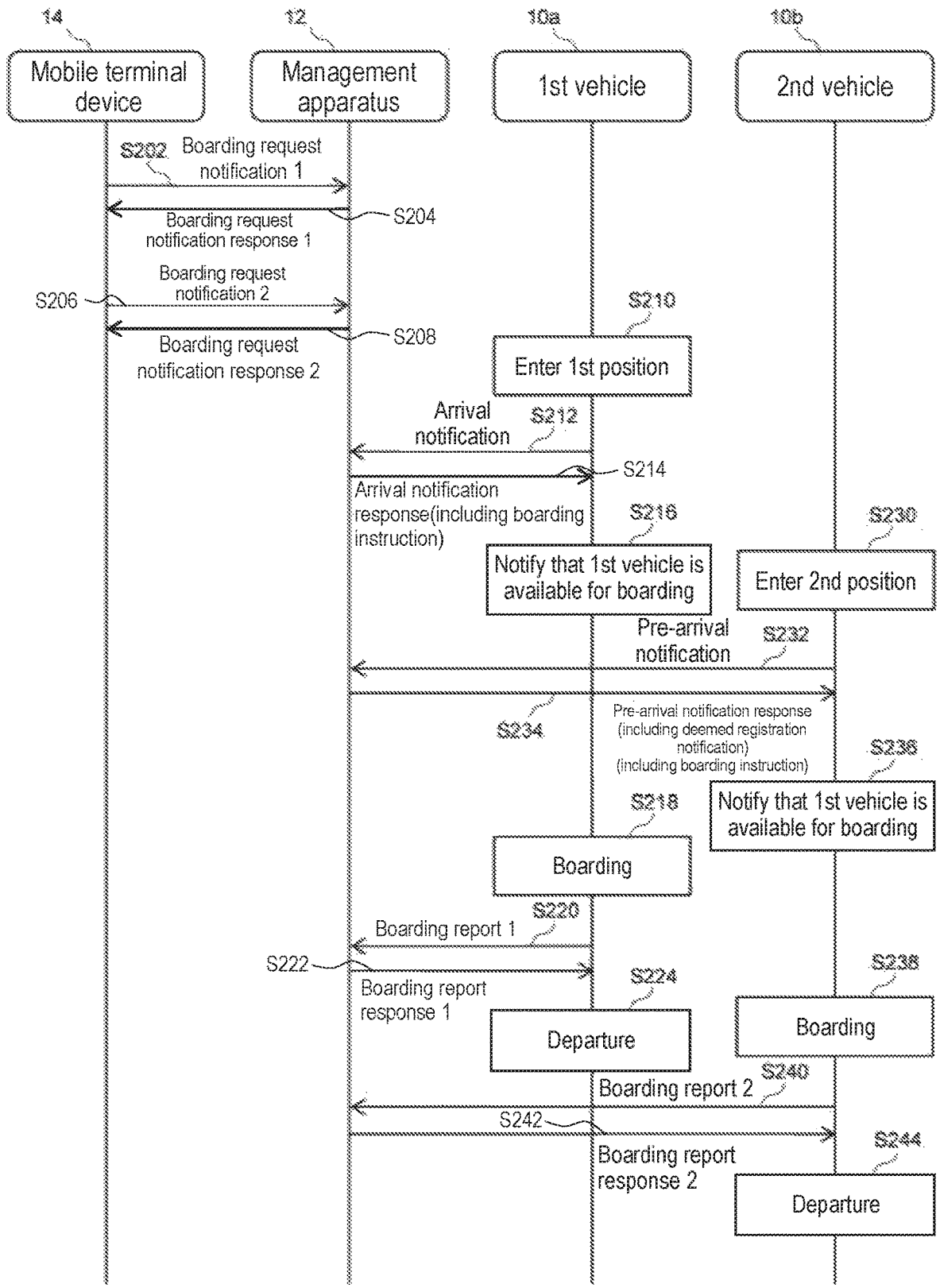
FIG. 13 is a different sequence diagram for describing the operation of management system 100 according to the second exemplary embodiment.
Figure 14:
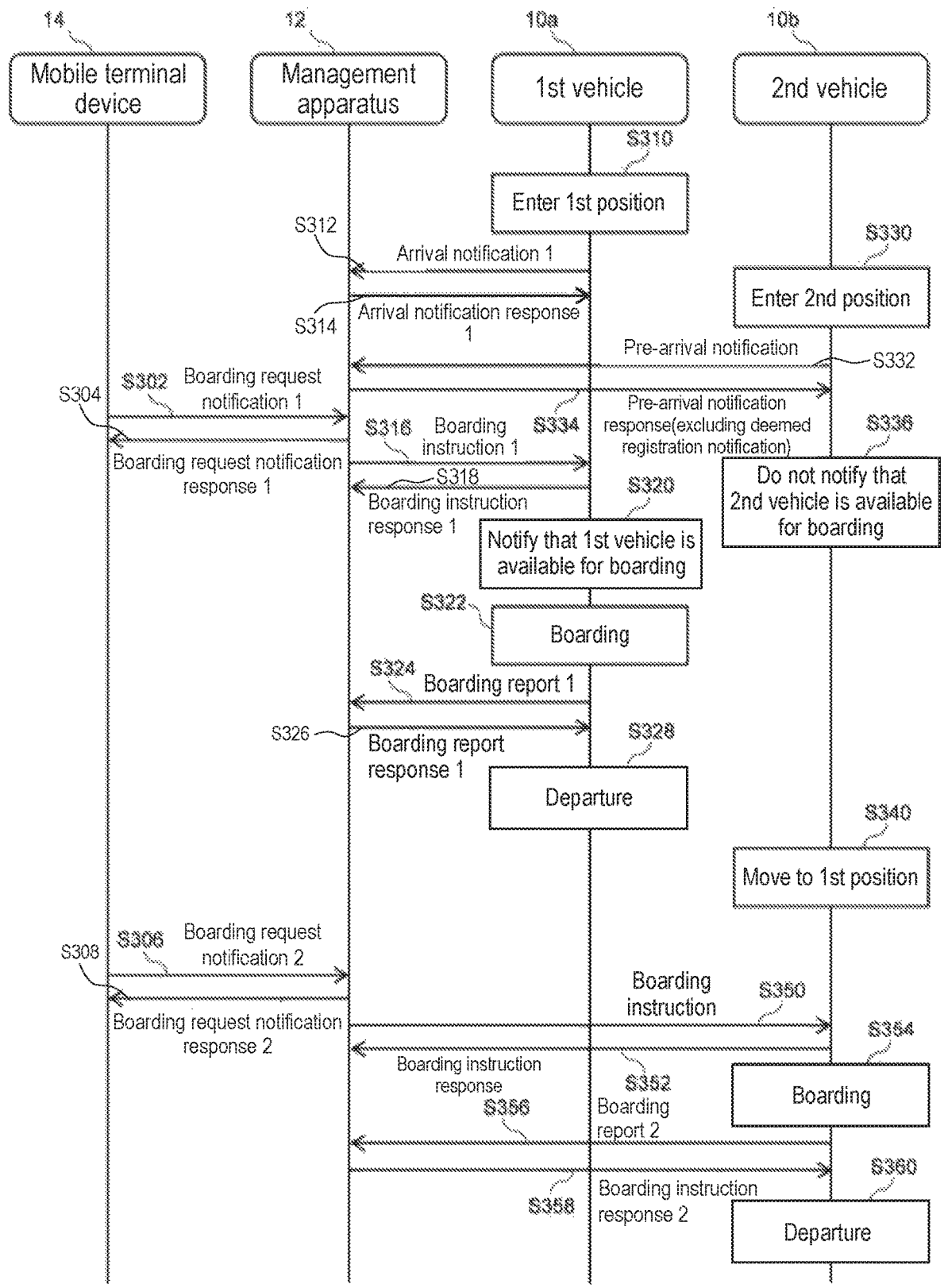
FIG. 14 is a still different sequence diagram for describing the operation of management system 100 in the second exemplary embodiment.
Figure 15:
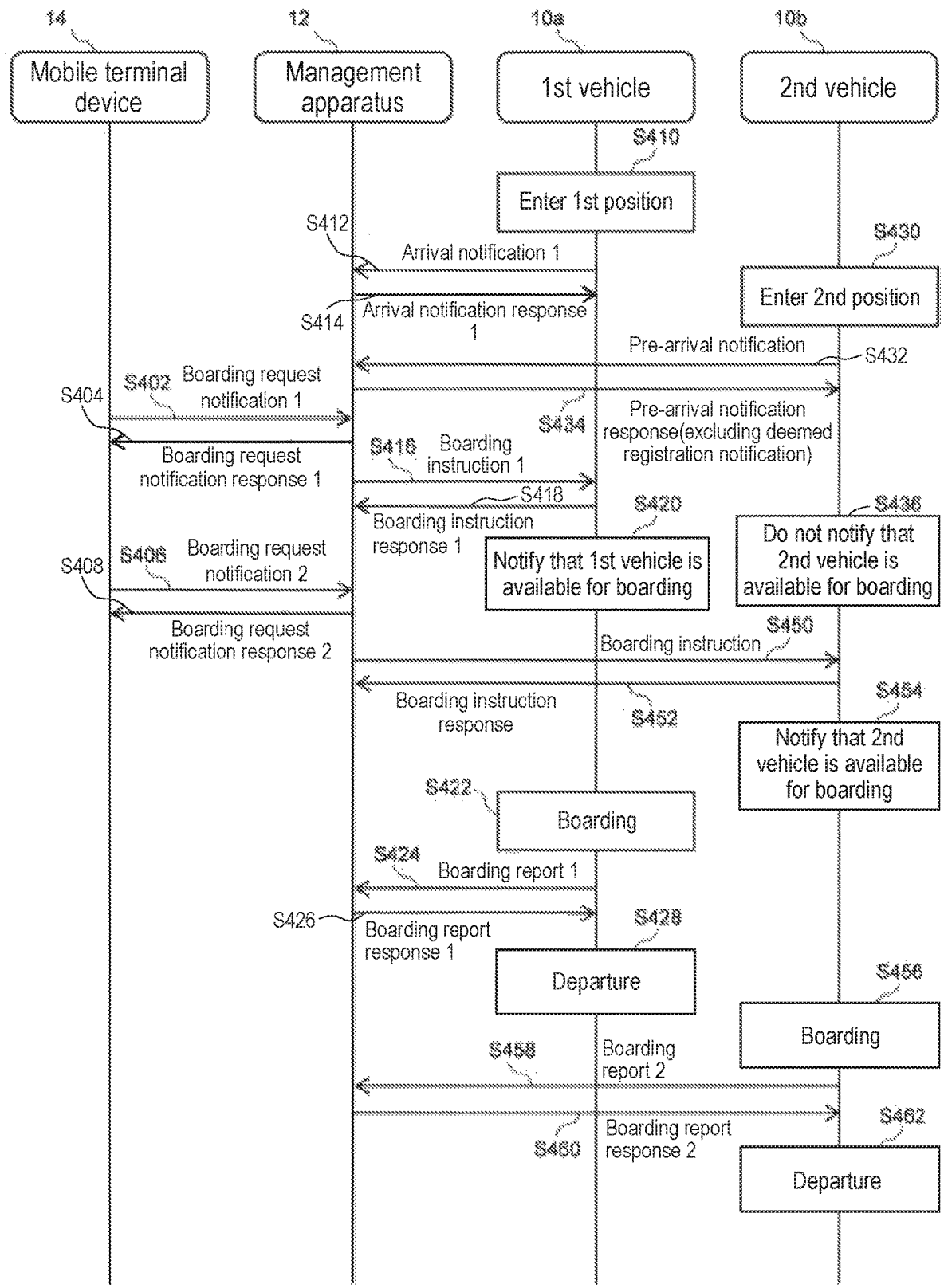
FIG. 15 is a still different sequence diagram for describing the operation of management system 100 in the second exemplary embodiment.

An operation of management system 100 will now be described with reference to sequence diagrams in FIGS. 12 to 15 in which a first vehicle having a first notification unit operative to send a first notification and a second vehicle having a second notification unit operative to send a second notification are included. FIGS. 12 and 13 will mainly describe an operation of a case where control device 24 receives the boarding request notification earlier than the arrival notification and the pre-arrival notification. FIGS. 14 and 15 will mainly describe an operation of a case where control device 24 receives the arrival notification and the pre-arrival notification earlier than the boarding request notification.

FIG. 12 is a sequence diagram for describing the operation of management system 100 of the second exemplary embodiment. In the sequence diagram in FIG. 12, a case of a situation in which count M=2, which is the number of vehicles 10, and count N=1, which is the number of boarding requests, are satisfied in boarding area 200 to occur will be described. Further, a case where management apparatus 12 receives the boarding request notification earlier than the arrival notification will be described. In an initial state, it is assumed that no vehicle 10 is present in boarding area 200 and no boarding request is received, that is, M=0 and N=0 are satisfied.

First, based on, for example, an operation of the user who requests boarding, mobile terminal device 14 transmits the boarding request notification, and management apparatus 12 receives this boarding request notification (step S102). At this moment, the count in counter 330 and the count in counter 340 of management apparatus 12 satisfy M=0 and N=1, respectively. Next, management apparatus 12 transmits the boarding request notification response, and mobile terminal device 14 receives this boarding request notification response (step S104). At this moment, M≥N is not satisfied, whereby management apparatus 12 does not transmit the boarding instruction.

When first vehicle 10a that is vehicle 10 then enters the first position (step S110), first vehicle 10a transmits the arrival notification, and management apparatus 12 receives this arrival notification (step S112). At this moment, the count in counter 330 and the count in counter 340 of management apparatus 12 satisfy M=1 and N=1, respectively. Next, management apparatus 12 transmits the arrival notification response, and first vehicle 10a receives this arrival notification response (step S114). When management apparatus 12 receives the arrival notification, N≥M is satisfied, whereby the arrival notification response in step S114 includes the boarding instruction. First vehicle 10a that has received the boarding instruction notifies that boarding is allowed (step S116). First vehicle 10a then unlock lock 39 in door 38, and allows the user to board (step S118). When the boarding is completed, first vehicle 10a transmits the boarding report, and management apparatus 12 receives this boarding report (step S120). Management apparatus 12 that has received the boarding report transmits the boarding report response, and first vehicle 10a receives this boarding report response (step S122). First vehicle 10a then departs and leaves boarding area 200 (step S124).

While first vehicle 10a stops at the first position, second vehicle 10b that is vehicle 10 different from first vehicle 10a is assumed to enter the second position (step S130). Further, before management apparatus 12 receives the boarding report from first vehicle 10a in step S120, management apparatus 12 is assumed to receive the pre-arrival notification transmitted from second vehicle 10b (step S132). At this moment, the count in counter 330 and the count in counter 340 of management apparatus 12 satisfy M=2 and N=1, respectively. Next, management apparatus 12 transmits the pre-arrival notification response, and second vehicle 10b receives this pre-arrival notification response (step S134). When management apparatus 12 receives the pre-arrival notification, the condition N≥M is not satisfied, whereby the boarding instruction is not included in the pre-arrival notification response in step S134, that is, the pre-arrival notification response that is not the deemed arrival notification is transmitted and received. Second vehicle 10b that has not received the deemed arrival notification does not notify that boarding is allowed (step S136).

After that, in step S120, when management apparatus 12 receives the boarding report from first vehicle 10a, the count in counter 330 and the count in counter 340 of management apparatus 12 satisfy M=1 and N=0, respectively. When first vehicle 10a then departs and leaves boarding area 200 in step S124, second vehicle 10b moves to the first position, and stops at the first position (step S140).

After that, when management apparatus 12 receives the boarding request notification (step S106), management apparatus 12 transmits the boarding request notification response (step S108). When management apparatus 12 receives the boarding request notification, the count in counter 330 and the count in counter 340 of management apparatus 12 satisfy M=1 and N=1, respectively. The condition M≥N is thus satisfied. Therefore, management apparatus 12 transmits the boarding instruction to second vehicle 10b, and second vehicle 10b receives this boarding instruction (step S150). Second vehicle 10b that has received the boarding instruction allows the user to board (step S154), and when the boarding is completed, second vehicle 10b transmits the boarding report (step S156). Management apparatus 12 that has received the boarding report transmits the boarding report response, and second vehicle 10b receives this boarding report response (step S158). Second vehicle 10b then departs and leaves boarding area 200 (step S160).

As described above, in the case illustrated in the sequence diagram in FIG. 12, the situation in which count M=2, which is the number of vehicles 10, and count N=1, which is the number of boarding requests, are satisfied in boarding area 200 occurs. In other words, the situation in which first vehicle 10a and second vehicle 10b stand by in boarding area 200 in a file, first vehicle 10a is located at the first position that is a leading position in the file, second vehicle 10b is located at the second position that is a position next to first vehicle 10a in the file, and one piece of the boarding request notification corresponding to boarding area 200 is transmitted from mobile terminal device 14 occurs. In this case, notification unit 32 in first vehicle 10a notifies that first vehicle 10a is available for boarding (step S116), and notification unit 32 in second vehicle 10b does not notify that second vehicle 10b is available for boarding (step S136).

FIG. 13 is a different sequence diagram for describing the operation of management system 100 in the second exemplary embodiment. In the sequence diagram in FIG. 13, a case of a situation in which count M=2, which is the number of vehicles 10, and count N=2, which is the number of boarding requests, are satisfied in boarding area 200 to occur will be described. Further, a case where management apparatus 12 receives the boarding request notification earlier than the arrival notification will be described. In an initial state, it is assumed that no vehicle 10 is present in boarding area 200 and no boarding request is received, that is, M=0 and N=0 are satisfied.

First, based on, for example, the operation of the user who requests boarding, mobile terminal device 14 transmits the boarding request notification, and management apparatus 12 receives this boarding request notification (step S202). At this moment, the count in counter 330 and the count in counter 340 of management apparatus 12 satisfy M=0 and N=1, respectively. Next, management apparatus 12 transmits the boarding request notification response, and mobile terminal device 14 receives this boarding request notification response (step S204). At this moment, M≥N is not satisfied, whereby management apparatus 12 does not transmit the boarding instruction.

After that, based on, for example, an operation of another user who requests boarding, mobile terminal device 14 transmits the boarding request notification, and management apparatus 12 receives this boarding request notification (step S206). At this moment, the count in counter 330 and the count in counter 340 of management apparatus 12 satisfy M=0 and N=2, respectively. Next, management apparatus 12 transmits the boarding request notification response, and mobile terminal device 14 receives this boarding request notification response (step S208). At this moment, M≥N is not satisfied, whereby management apparatus 12 does not transmit the boarding instruction.

When first vehicle 10a that is vehicle 10 then enters the first position (step S210), first vehicle 10a transmits the arrival notification, and management apparatus 12 receives this arrival notification (step S212). At this moment, the count in counter 330 and the count in counter 340 of management apparatus 12 satisfy M=1 and N=2, respectively. Next, management apparatus 12 transmits the arrival notification response, and first vehicle 10*a* receives this arrival notification response (step S214). When management apparatus 12 receives the arrival notification, N≥M is satisfied, whereby the arrival notification response in step S214 includes the boarding instruction. First vehicle 10*a* that has received the boarding instruction notifies that boarding is allowed (step S216). First vehicle 10*a* then unlock lock 39 in door 38, and allows the user to board (step S218). When the boarding is completed, first vehicle 10*a* transmits the boarding report, and management apparatus 12 receives this boarding report (step S220). Management apparatus 12 that has received the boarding report transmits the boarding report response, and first vehicle 10*a* receives this boarding report response (step S222). First vehicle 10*a* then departs and leaves boarding area 200. At this moment, second vehicle 10*b* does not pass through the first position (step S224).

While first vehicle 10*a* stops at the first position, second vehicle 10*b* that is vehicle 10 different from first vehicle 10*a* is assumed to enter the second position and is located at the second position (step S230). Further, before management apparatus 12 receives the boarding report from first vehicle 10*a* in step S220, management apparatus 12 is assumed to receive the pre-arrival notification transmitted from second vehicle 10*b* (step S232). At this moment, the count in counter 330 and the count in counter 340 of management apparatus 12 satisfy M=2 and N=2, respectively. Next, management apparatus 12 transmits the pre-arrival notification response, and second vehicle 10*b* receives this pre-arrival notification response (step S234). When management apparatus 12 receives the pre-arrival notification, the condition N≥M is satisfied, whereby the boarding instruction is included in the pre-arrival notification response in step S234, that is, the pre-arrival notification response that is the deemed arrival notification is transmitted and received. Second vehicle 10*b* that has received the deemed arrival notification, that is, the boarding instruction notifies that boarding is allowed (step S236). Second vehicle 10*b* then unlock lock 39 in door 38 at the second position, and allows the user to board (step S238). When the boarding is completed, second vehicle 10*b* transmits the boarding report, and management apparatus 12 receives this boarding report (step S240). Management apparatus 12 that has received the boarding report transmits the boarding report response, and second vehicle 10*b* receives this boarding report response (step S242). Second vehicle 10*b* then departs from the second position and leaves boarding area 200 (step S244).

As described above, in the case illustrated in the sequence diagram in FIG. 13, the situation in which count M=2, which is the number of vehicles 10, and count N=2, which is the number of boarding requests, are satisfied in boarding area 200 occurs. In other words, the situation in which first vehicle 10*a* and second vehicle 10*b* stand by in boarding area 200 in a file, first vehicle 10*a* is located at the first position, second vehicle 10*b* is located at the second position, and the boarding request notification corresponding to boarding area 200 is transmitted at least twice from mobile terminal device 14 occurs. In this case, notification unit 32 in first vehicle 10*a* notifies that first vehicle 10*a* is available for boarding (step S216), and notification unit 32 in second vehicle 10*b* notifies that second vehicle 10*b* is available for boarding (step S236).

FIG. 14 is a still different sequence diagram for describing the operation of management system 100 in the second exemplary embodiment. In the sequence diagram in FIG. 14, a case of a situation in which count M=2, which is the number of vehicles 10, and count N=1, which is the number of boarding requests, are satisfied in boarding area 200 to occur will be described. Further, a case where management apparatus 12 receives the arrival notification earlier than the boarding request notification will be described. In an initial state, it is assumed that no vehicle 10 is present in boarding area 200 and no boarding request is received, that is, M=0 and N=0 are satisfied.

First, when first vehicle 10*a* that is vehicle 10 enters the first position (step S310), first vehicle 10*a* transmits the arrival notification, and management apparatus 12 receives this arrival notification (step S312). At this moment, the count in counter 330 and the count in counter 340 of management apparatus 12 satisfy M=1 and N=0, respectively. Next, management apparatus 12 transmits the arrival notification response, and first vehicle 10*a* receives this arrival notification response (step S314). When management apparatus 12 receives the arrival notification, N≥M is not satisfied, whereby the arrival notification response in step S314 does not include the boarding instruction. First vehicle 10*a* that has not received the boarding instruction does not notify that boarding is allowed.

When second vehicle 10*b* that is vehicle 10 then enters the second position (step S330), second vehicle 10*b* transmits the pre-arrival notification, and management apparatus 12 receives this pre-arrival notification (step S332). At this moment, the count in counter 330 and the count in counter 340 of management apparatus 12 satisfy M=2 and N=0, respectively. Next, management apparatus 12 transmits the pre-arrival notification response, and second vehicle 10*b* receives this pre-arrival notification response (step S334). When management apparatus 12 receives the pre-arrival notification, N≥M is not satisfied, whereby the pre-arrival notification response in step S334 does not include the boarding instruction. Second vehicle 10*b* that has not received the boarding instruction does not notify that boarding is allowed (step S336).

After that, based on, for example, the operation of the user who requests boarding, mobile terminal device 14 transmits the boarding request notification, and management apparatus 12 receives this boarding request notification (step S302). At this moment, the count in counter 330 and the count in counter 340 of management apparatus 12 satisfy M=2 and N=1, respectively. Next, management apparatus 12 transmits the boarding request notification response, and mobile terminal device 14 receives this boarding request notification response (step S304). At this point of time when management apparatus 12 receives the boarding request notification, the condition M≥N is satisfied. Therefore, management apparatus 12 transmits the boarding instruction to first vehicle 10*a*, and first vehicle 10*a* receives this boarding instruction (step S316). First vehicle 10*a* that has received the boarding instruction transmits the boarding instruction response, and management apparatus 12 receives this boarding instruction response (step S318). Also, first vehicle 10*a* that has received the boarding instruction notifies that boarding is allowed (step S320), and allows the user to board (step S332). When boarding is completed, first vehicle 10*a* transmits the boarding report (step S324). Management apparatus 12 that has received the boarding report transmits the boarding report response, and first vehicle 10*a* receives this boarding report response (step S326). First vehicle 10*a* then departs and leaves boarding area 200 (step S328). At this point of time when management apparatus 12 receives the boarding report, the count in counter 330 and the count in counter 340 of management apparatus 12 satisfy M=1 and N=0, respectively.

After first vehicle 10a departs and leaves boarding area 200, second vehicle 10b moves to the first position, and stops at the first position (step S340).

After that, based on, for example, an operation of another user who requests boarding, mobile terminal device 14 transmits the boarding request notification, and management apparatus 12 receives this boarding request notification (step S306). At this moment, the count in counter 330 and the count in counter 340 of management apparatus 12 satisfy M=1 and N=1, respectively. Next, management apparatus 12 transmits the boarding request notification response, and mobile terminal device 14 receives this boarding request notification response (step S308). At this point of time when management apparatus 12 receives the boarding request notification, the condition M≥N is satisfied. Therefore, management apparatus 12 transmits the boarding instruction to second vehicle 10b, and second vehicle 10b receives this boarding instruction (step S350). Second vehicle 10b that has received the boarding instruction transmits the boarding instruction response, and management apparatus 12 receives this boarding instruction response (step S352). Also, second vehicle 10b that has received the boarding instruction notifies that boarding is allowed, and allows the user to board (step S354). When boarding is completed, second vehicle 10b transmits the boarding report (step S356). Management apparatus 12 that has received the boarding report transmits the boarding report response, and second vehicle 10b receives this boarding report response (step S358). Second vehicle 10b then departs and leaves boarding area 200 (step S360).

As described above, in the case illustrated in the sequence diagram in FIG. 14, the situation in which count M=2, which is the number of vehicles 10, and count N=1, which is the number of boarding requests, are satisfied in boarding area 200 occurs. In other words, the situation in which first vehicle 10a and second vehicle 10b stand by in boarding area 200 in a file, first vehicle 10a is located at the first position that is a leading position in the file, second vehicle 10b is located at the second position that is a position next to first vehicle 10a in the file, and one piece of the boarding request notification corresponding to boarding area 200 is transmitted from mobile terminal device 14 occurs. In this case, notification unit 32 in first vehicle 10a notifies that first vehicle 10a is available for boarding (step S320), and notification unit 32 in second vehicle 10b does not notify that second vehicle 10b is available for boarding (step S336).

FIG. 15 is a still different sequence diagram for describing the operation of management system 100 in the second exemplary embodiment. In the sequence diagram in FIG. 15, a case of a situation in which count M=2, which is the number of vehicles 10, and count N=2, which is the number of boarding requests, are satisfied in boarding area 200 to occur will be described. Further, a case where management apparatus 12 receives the arrival notification earlier than the boarding request notification will be described. In an initial state, it is assumed that no vehicle 10 is present in boarding area 200 and no boarding request is received, that is, M=0 and N=0 are satisfied.

First, when first vehicle 10a that is vehicle 10 enters the first position (step S410), first vehicle 10a transmits the arrival notification, and management apparatus 12 receives this arrival notification (step S412). At this moment, the count in counter 330 and the count in counter 340 of management apparatus 12 satisfy M=1 and N=0, respectively. Next, management apparatus 12 transmits the arrival notification response, and first vehicle 10a receives this arrival notification response (step S414). At this point of time when management apparatus 12 receives the arrival notification, N≥M is not satisfied, whereby the arrival notification response in step S414 does not include the boarding instruction. First vehicle 10a that has not received the boarding instruction does not notify that boarding is allowed.

When second vehicle 10b that is vehicle 10 then enters the second position (step S430), second vehicle 10b transmits the pre-arrival notification, and management apparatus 12 receives this pre-arrival notification (step S432). At this moment, the count in counter 330 and the count in counter 340 of management apparatus 12 satisfy M=2 and N=0, respectively. Next, management apparatus 12 transmits the pre-arrival notification response, and second vehicle 10b receives this pre-arrival notification response (step S434). At this point of time when management apparatus 12 receives the pre-arrival notification, the condition N≥M is not satisfied, whereby the pre-arrival notification response in step S434 does not include the boarding instruction. Second vehicle 10b that has not received the boarding instruction does not notify that boarding is allowed (step S436).

After that, based on, for example, the operation of the user who requests boarding, mobile terminal device 14 transmits the boarding request notification, and management apparatus 12 receives this boarding request notification (step S402). At this moment, the count in counter 330 and the count in counter 340 of management apparatus 12 satisfy M=2 and N=1, respectively. Next, management apparatus 12 transmits the boarding request notification response, and mobile terminal device 14 receives this boarding request notification response (step S404). At this point of time when management apparatus 12 receives the boarding request notification, the condition M≥N is satisfied. Therefore, management apparatus 12 transmits the boarding instruction to first vehicle 10a, and first vehicle 10a receives this boarding instruction (step S416). First vehicle 10a that has received the boarding instruction transmits the boarding instruction response, and management apparatus 12 receives this boarding instruction response (step S418). Also, first vehicle 10a that has received the boarding instruction notifies that boarding is available (step S420), and allows the user to board (step S422). When boarding is completed, first vehicle 10a transmits the boarding report (step S424). Management apparatus 12 that has received the boarding report transmits the boarding report response, and first vehicle 10a receives this boarding report response (step S426). First vehicle 10a then departs and leaves boarding area 200 (step S428).

It is assumed that, before management apparatus 12 receives the boarding report from first vehicle 10a in step S424, based on, for example, an operation of another user who requests boarding, mobile terminal device 14 transmits the boarding request notification, and management apparatus 12 receives this boarding request notification (step S406). At this moment, the count in counter 330 and the count in counter 340 of management apparatus 12 satisfy M=2 and N=2, respectively. Next, management apparatus 12 transmits the boarding request notification response, and mobile terminal device 14 receives this boarding request notification response (step S408). At this point of time when management apparatus 12 receives the boarding request notification, the condition M≥N is satisfied. Therefore, management apparatus 12 transmits the boarding instruction to second vehicle 10b, and second vehicle 10b receives this boarding instruction (step S450). Second vehicle 10b that has received the boarding instruction transmits the boarding instruction response, and management apparatus 12 receives this boarding instruction response (step S452). Also, second vehicle 10b that has received the boarding instruction notifies that boarding is allowed (step S452), and allows the user to board at the second position (step S456). When boarding is completed, second vehicle 10b transmits the boarding report (step S458). Management apparatus 12 that has received the boarding report transmits the boarding report response, and second vehicle 10b receives this boarding report response (step S460). Second vehicle 10b then departs from the second position and leaves boarding area 200. At this moment, second vehicle 10b does not pass through the first position (step S462).

As described above, in the case illustrated in the sequence diagram in FIG. 15, the situation in which count M=2, which is the number of vehicles 10, and count N=2, which is the number of boarding requests, are satisfied in boarding area 200 occurs. In other words, the situation in which first vehicle 10a and second vehicle 10b stand by in boarding area 200 in a file, first vehicle 10a is located at the first position, second vehicle 10b is located at the second position, and the boarding request notification corresponding to boarding area 200 is transmitted at least twice from mobile terminal device 14 occurs. In this case, notification unit 32 in first vehicle 10a notifies that first vehicle 10a is available for boarding (step S420), and notification unit 32 in second vehicle 10b notifies that second vehicle 10b is available for boarding (step S454).

Effects

According to the second exemplary embodiment of the present disclosure, the arrival notification is received from the control device of the vehicle arrived at the boarding point, and the pre-arrival notification is received from the control device of the vehicle that enters the boarding area and does not arrive at the boarding point. This enables confirmation of a number of vehicles stopping in the boarding area. Further, based on the number of vehicles stopping in the boarding area and a number of vehicles requested for boarding, a number of vehicles that allows a plurality of users to simultaneously board the vehicles in the boarding area can be confirmed. The deemed arrival notification is transmitted to the control device of each of the vehicles other than the leading vehicle among the vehicles that allow simultaneous boarding. This can cause the vehicles to stop moving to the boarding point. The vehicles are caused to stop moving to the boarding point, whereby safe vehicle boarding can be achieved. The arrival notification or the pre-arrival notification is transmitted according to the situation, whereby the management apparatus can be informed of the situation of the vehicles. Even when the vehicle does not arrive at the boarding point, if the deemed arrival notification is received, the vehicle is caused to stop moving to the boarding point, whereby safe vehicle boarding can be achieved.

An outline of one aspect of the present disclosure is as follows. A vehicle operation management system according to one aspect of the present disclosure includes a communication terminal and a plurality of vehicles. The plurality of vehicles is communicating with the communication terminal, and is autonomously driving. The plurality of vehicles stands by in a predetermined boarding area in a file, and can accept boarding of a user at least at a leading portion in the file. The plurality of vehicles includes a first vehicle and a second vehicle. The first vehicle includes a first notification unit that is operative to send a first notification to an outside of the first vehicle. The second vehicle includes a second notification unit that is operative to send a second notification to an outside of the second vehicle. When the first vehicle and the second vehicle stand by in the predetermined boarding area in the file, the first vehicle is located at a first position that is the leading portion in the file, the second vehicle is located at a second position that is a position next to the first vehicle in the file, and one boarding request corresponding to the predetermined boarding area is made from the communication terminal, the first notification unit in the first vehicle sends the first notification indicating that the first vehicle is available for boarding, and the second notification unit in the second vehicle does not send the second notification indicating that the second vehicle is available for boarding. When the first vehicle and the second vehicle stand by in the predetermined boarding area in the file, the first vehicle is located at the first position, the second vehicle is located at the second position, and at least two boarding requests corresponding to the predetermined boarding area are made from the communication terminal, the first notification unit in the first vehicle sends the first notification indicating that the first vehicle is available for boarding, and the second notification unit in the second vehicle sends the second notification indicating that the second vehicle is available for boarding.

With this aspect, safe vehicle boarding can be achieved.

A vehicle operation management method according to another aspect of the present disclosure can be used in a vehicle operation management system including a communication terminal and a plurality of vehicles. The plurality of vehicles is communicating with the communication terminal, and is autonomously driving. The plurality of vehicles stands by in a predetermined boarding area in a file, and can accept boarding of a user at least at a leading portion in the file. The plurality of vehicles includes a first vehicle and a second vehicle. The first vehicle includes a first notification unit that is operative to send a first notification to an outside of the first vehicle. The second vehicle includes a second notification unit that is operative to send a second notification to an outside of the second vehicle. In the vehicle operation management method, when the first vehicle and the second vehicle stand by in the predetermined boarding area in the file, the first vehicle is located at a first position that is a leading portion in the file, the second vehicle is located at a second position that is a position next to the first vehicle in the file, and one boarding request corresponding to the predetermined boarding area is made from the communication terminal, the first notification unit in the first vehicle sends the first notification indicating that the first vehicle is available for boarding, and the second notification unit in the second vehicle does not send the second notification indicating that the second vehicle is available for boarding. Furthermore, in the vehicle operation management method, when the first vehicle and the second vehicle stand by in the predetermined boarding area in the file, the first vehicle is located at the first position, the second vehicle is located at the second position, and at least two boarding requests corresponding to the predetermined boarding area are made from the communication terminal, the first notification unit in the first vehicle sends the first notification indicating that the first vehicle is available for boarding, and the second notification unit in the second vehicle sends the second notification indicating that the second vehicle is available for boarding.

With this aspect, safe vehicle boarding can be achieved.

The present disclosure has been described above using the exemplary embodiments. It will be understood by those skilled in the art that the exemplary embodiments are merely examples, other modifications in which components and/or processes of the exemplary embodiments are variously combined are possible, and the other modifications are still fall within the scope of the present disclosure.

In the exemplary embodiments, vehicle 10 is assumed to be a taxi. However, the present disclosure is not limited to this, and vehicle 10 may be a vehicle for car sharing or a rental car.

The present disclosure is useful as a vehicle operation management system and a vehicle operation management method, for example.

What is claimed is:

1. A vehicle operation management system, comprising:
a communication terminal; and
a plurality of vehicles configured to communicate with the communication terminal, and capable of autonomous driving,
wherein the plurality of vehicles is operative to stand by in a predetermined boarding area in a file, and accept boarding of a user at least at a leading portion in the file,
the plurality of vehicles includes a first vehicle and a second vehicle,
the first vehicle includes a first notification unit configured to provide a first notification to an outside of the first vehicle,
the second vehicle includes a second notification unit configured to provide a second notification to an outside of the second vehicle,
when the first vehicle and the second vehicle stand by in the predetermined boarding area in the file, the first vehicle is located at a first position that is the leading portion in the file, the second vehicle is located at a second position that is a position next to the first vehicle in the file, and one boarding request corresponding to the predetermined boarding area is made from the communication terminal, the first notification unit in the first vehicle provides the first notification indicating that the first vehicle is available for boarding, and the second notification unit in the second vehicle does not provide the second notification indicating that the second vehicle is available for boarding, and
when the first vehicle and the second vehicle stand by in the predetermined boarding area in the file, the first vehicle is located at the first position, the second vehicle is located at the second position, and at least two boarding requests corresponding to the predetermined boarding area are made from the communication terminal, the first notification unit in the first vehicle provides the first notification indicating that the first vehicle is available for boarding, and the second notification unit in the second vehicle provides the second notification indicating that the second vehicle is available for boarding.

2. The vehicle operation management system according to claim 1, wherein
when the first vehicle and the second vehicle stand by in the predetermined boarding area in the file, the first vehicle is located at the first position, the second vehicle is located at the second position, and the one boarding request corresponding to the predetermined boarding area is made from the communication terminal:
when the user boards the first vehicle, after the first notification unit in the first vehicle provides the first notification indicating that the first vehicle is available for boarding, the first vehicle departs from the first position; and after the first vehicle departs from the first position, the second vehicle autonomously moves to the first position, and stops at the first position.

3. The vehicle operation management system according to claim 1, wherein
when the first vehicle and the second vehicle stand by in the predetermined boarding area in the file, the first vehicle is located at the first position, the second vehicle is located at the second position, and the at least two boarding requests corresponding to the predetermined boarding area are made from the communication terminal:
when the user or a second user boards the second vehicle, after the second notification unit in the second vehicle provides the second notification indicating that the second vehicle is available for boarding, the second vehicle departs from the second position.

4. The vehicle operation management system according to claim 3, wherein
when the first vehicle and the second vehicle stand by in the predetermined boarding area in the file, the first vehicle is located at the first position, the second vehicle is located at the second position, and the at least two boarding requests corresponding to the predetermined boarding area are made from the communication terminal:
when the user or a second user boards the second vehicle, after the second notification unit in the second vehicle provides the second notification indicating that the second vehicle is available for boarding, the second vehicle departs from the second position, and does not pass through at least the first position.

5. The vehicle operation management system according to claim 1, wherein
the first notification unit in the first vehicle includes a display, and
the display is operative to display an indication that the first vehicle is available for boarding.

6. The vehicle operation management system according to claim 1, wherein
the first notification unit in the first vehicle includes a sound emission unit, and
the sound emission unit emits a vocal sound indicating that the first vehicle is available for boarding.

7. The vehicle operation management system according to claim 1, wherein
the first vehicle includes a door with a lock, and
when the first notification unit provides the first notification indicating that the first vehicle is available for boarding, the lock of the door is unlocked.

8. The vehicle operation management system according to claim 7, wherein the lock of the door is unlocked within a predetermined time after the first notification unit provides the first notification indicating that the first vehicle is available for boarding.

9. The vehicle operation management system according to claim 7, wherein the first notification unit provides the first notification indicating that the first vehicle is available for boarding within a predetermined time after the lock of the door is unlocked.

10. A vehicle operation management method that is used in a vehicle operation management system, the vehicle operation management method comprising:
receiving, at a communication terminal, at least one boarding request corresponding to a predetermined boarding area, the communication terminal configured to communicate with a plurality of vehicles, the plurality of vehicles capable of autonomous driving, the plurality of vehicles being operative to stand by in the predetermined boarding area in a file and to accept boarding of a user at least at a leading portion in the file;

when a first vehicle of the plurality of vehicles and a second vehicle of the plurality of vehicles stand by in the predetermined boarding area in the file, the first vehicle is located at a first position that is the leading portion in the file, the second vehicle is located at a second position that is a position next to the first vehicle in the file, and one boarding request corresponding to the predetermined boarding area is received at the communication terminal, providing, by a first notification unit in the first vehicle, a first notification to an outside of the first vehicle indicating that the first vehicle is available for boarding, and not providing, by a second notification unit in the second vehicle, a second notification to an outside of the second vehicle indicating that the second vehicle is available for boarding; and when the first vehicle and the second vehicle stand by in the predetermined boarding area in the file, the first vehicle is located at the first position, the second vehicle is located at the second position, and at least two boarding requests corresponding to the predetermined boarding area are received at the communication terminal, providing, by the first notification unit in the first vehicle, the first notification indicating that the first vehicle is available for boarding, and providing, by the second notification unit in the second vehicle, the second notification indicating that the second vehicle is available for boarding.

11. The vehicle operation management method according to claim 10, further comprising:

when the first vehicle and the second vehicle stand by in the predetermined boarding area in the file, the first vehicle is located at the first position, the second vehicle is located at the second position, and the one boarding request corresponding to the predetermined boarding area is received at the communication terminal:

when the user boards the first vehicle, after the first notification unit in the first vehicle provides the first notification indicating that the first vehicle is available for boarding, moving the first vehicle from the first position; and after the first vehicle departs from the first position, autonomously moving the second vehicle to the first position, and stopping the second vehicle at the first position.

12. The vehicle operation management method according to claim 10, further comprising:

when the first vehicle and the second vehicle stand by in the predetermined boarding area in the file, the first vehicle is located at the first position, the second vehicle is located at the second position, and the at least two boarding requests corresponding to the predetermined boarding area are received at the communication terminal:

when the user or a second user boards the second vehicle, after the second notification unit in the second vehicle provides the second notification indicating that the second vehicle is available for boarding, moving the second vehicle from the second position.

13. The vehicle operation management method according to claim 12, further comprising:

when the first vehicle and the second vehicle stand by in the predetermined boarding area in the file, the first vehicle is located at the first position, the second vehicle is located at the second position, and the at least two boarding requests corresponding to the predetermined boarding area are received at the communication terminal:

when the user or a second user boards the second vehicle, after the second notification unit in the second vehicle provides the second notification indicating that the second vehicle is available for boarding, moving the second vehicle from the second position, and not passing the second vehicle through at least the first position.

14. The vehicle operation management method according to claim 10, wherein the first notification unit in the first vehicle includes a display, and the providing of the first notification includes displaying, by the display, that boarding is available.

15. The vehicle operation management method according to claim 10, wherein the first notification unit in the first vehicle includes a sound emission unit, and the providing of the first notification includes emitting, by the sound emission unit, a vocal sound indicating that boarding is available.

16. The vehicle operation management method according to claim 10, wherein the first vehicle includes a door with a lock, and the vehicle operation management method further comprises:

when the first notification unit provides the first notification indicating that the first vehicle is available for boarding, unlocking the lock of the door.

17. The vehicle operation management method according to claim 16, wherein the lock of the door is unlocked within a predetermined time after the first notification unit provides the first notification indicating that the first vehicle is available for boarding.

18. The vehicle operation management method according to claim 16, wherein the first notification unit provides the first notification indicating that the first vehicle is available for boarding within a predetermined time after the lock of the door is unlocked.

19. The vehicle operation management method according to claim 10, wherein the first notification unit in the first vehicle includes a speaker, and the speaker emits a vocal sound as the first notification.

20. The vehicle operation management system according to claim 1, wherein the first notification unit in the first vehicle includes a speaker, and the speaker emits a vocal sound as the first notification.

* * * * *